US010789188B1

(12) United States Patent
Winter et al.

(10) Patent No.: US 10,789,188 B1
(45) Date of Patent: Sep. 29, 2020

(54) SYSTEMS AND METHODS FOR PROVIDING SEMI-CUSTOM PRINTED CIRCUIT BOARDS BASED ON STANDARD INTERCONNECTIONS

(71) Applicant: Facebook, Inc., Menlo Park, CA (US)

(72) Inventors: Howard Winter, Romsey (GB); Peter John Richard Gilbert Bracewell, Union City, CA (US); Oliver Pell, London (GB)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/271,771

(22) Filed: Feb. 8, 2019

(51) Int. Cl.
*G06F 13/20* (2006.01)
*G06F 13/42* (2006.01)
*G06F 13/00* (2006.01)

(52) U.S. Cl.
CPC .......... *G06F 13/20* (2013.01); *G06F 13/4282* (2013.01); *G06F 2213/0026* (2013.01); *G06F 2213/0042* (2013.01)

(58) Field of Classification Search
CPC .. G06F 13/20; G06F 13/00; G06F 2213/0042; G06F 2313/0026
USPC .......................................................... 710/5
See application file for complete search history.

(56) References Cited

U.S. PATENT DOCUMENTS

| | | | | |
|---|---|---|---|---|
| 2004/0015637 A1* | 1/2004 | Yau | ..................... | G06F 13/4095 710/313 |
| 2004/0187043 A1* | 9/2004 | Swenson | ................... | G06F 1/12 713/400 |
| 2005/0188003 A1* | 8/2005 | Teramura | ................ | G06F 1/266 709/200 |
| 2006/0171689 A1* | 8/2006 | Smith | ...................... | H04N 5/76 386/231 |
| 2008/0281576 A1* | 11/2008 | Ohno | .................... | G06F 11/261 703/21 |
| 2008/0288233 A1* | 11/2008 | Ishii | .................... | G06F 17/5022 703/21 |
| 2009/0300253 A1* | 12/2009 | Lien | ...................... | G06F 13/387 710/302 |
| 2010/0235559 A1* | 9/2010 | Chen | .................... | G06F 3/0607 710/300 |
| 2011/0019384 A1* | 1/2011 | Kao | ....................... | G06F 1/183 361/803 |

(Continued)

*Primary Examiner* — Christopher B Shin
(74) *Attorney, Agent, or Firm* — FisherBroyles, LLP

(57) ABSTRACT

The disclosed system may include a central processing unit (CPU) interface board including a first standard port and a second standard port, a first peripheral board including a first augmented interface, the first augmented interface including first standard interface control signals and first additional interface control signals based on a first standard communication protocol, and a second peripheral board including a second augmented interface, the second augmented interface including second standard interface control signals and second additional interface control signals, the first standard interface control signals being connected to the first standard port, the second standard interface control signals being connected to the second standard port, and at least one of the first additional interface control signals being connected to a respective at least one of the second additional interface control signals. Various other methods, systems, and apparatus are also disclosed.

16 Claims, 13 Drawing Sheets

(56) References Cited

U.S. PATENT DOCUMENTS

| | | | |
|---|---|---|---|
| 2011/0116807 A1* | 5/2011 | Park | H04B 10/801 398/164 |
| 2012/0084479 A1* | 4/2012 | Hale | G06F 13/409 710/301 |
| 2012/0265918 A1* | 10/2012 | Nakajima | G06F 13/385 710/316 |
| 2012/0290759 A1* | 11/2012 | Blair | G05B 19/054 710/301 |
| 2013/0136194 A1* | 5/2013 | Harada | H04N 19/00 375/240.28 |
| 2013/0145052 A1* | 6/2013 | Aiken | G06F 9/4411 710/9 |
| 2013/0301202 A1* | 11/2013 | Fowler | G06F 1/1684 361/679.21 |
| 2016/0132086 A1* | 5/2016 | Hong | G06F 1/266 713/300 |
| 2017/0220505 A1* | 8/2017 | Breakstone | G06F 11/2015 |
| 2018/0095919 A1* | 4/2018 | Gay | G06F 13/385 |
| 2018/0293197 A1* | 10/2018 | Grobelny | G06F 13/385 |
| 2019/0050522 A1* | 2/2019 | Alvarez | G06F 15/17362 |
| 2019/0075343 A1* | 3/2019 | Cohen | G11B 27/02 |
| 2019/0340149 A1* | 11/2019 | Maier | G06F 13/4068 |

\* cited by examiner

SYSTEMS AND METHODS FOR PROVIDING SEMI-CUSTOM PRINTED CIRCUIT BOARDS BASED ON STANDARD INTERCONNECTIONS

BACKGROUND

A miniature portable computer (sometimes referred to as a nettop or mini-PC) may be a small, low-power, low cost, legacy-free desktop computer. Compared to a more traditional desktop computer, a mini-PC can provide a user with a smaller, lower cost solution for their computing needs. A user may customize a mini-PC to include one or more features that may satisfy the specific needs of the user. For example, a mini-PC may be customized for use in a video conferencing system, a gaming system, or as a media server. A mini-PC may be customized to interface to a variety of peripheral devices such as, for example, a high-definition television (HDTV), a tablet computer, a fingerprint reader, and a small monitor.

SUMMARY

As will be described in greater detail below, the instant disclosure describes providing a modular mini-PC solution using add-in (or plug-in) cards (or printed circuit (PC) boards) to provide additional functionality and/or customization to the mini-PC that leverages standard computer expansion bus interfaces for the add-in cards while using non-standard form factors for the standard interface connections that provide the standard signals provided by the standard interface along with additional signals that allow the implementing of augmented controls and functions within the mini-PC.

In one example, a system may include a central processing unit (CPU) interface board including a first standard port and a second standard port, a first peripheral board including a first augmented interface, the first augmented interface including first standard interface control signals and first additional interface control signals based on a first standard communication protocol, and a second peripheral board including a second augmented interface, the second augmented interface including second standard interface control signals and second additional interface control signals, the first standard interface control signals being connected to the first standard port, the second standard interface control signals being connected to the second standard port, and at least one of the first additional interface control signals being connected to a respective at least one of the second additional interface control signals.

Embodiments may include one or more of the following features, alone or in combination with one or more other features. For example, the system may further include a first augmented interface module including a first interface control module and a first additional interface control module. The first interface control module may be configured to implement the first standard communication protocol for use by the first augmented interface. The first additional interface control module may be configured to use the first standard communication protocol for implementing communications using the first additional interface control signals. The system may further include a second augmented interface module including a second interface control module and a second additional interface control module. The second interface control module may be configured to implement the second standard communication protocol for use by the second augmented interface. The second additional interface control module may be configured to use the second standard communication protocol for implementing communications using the second additional interface control signals. The first standard port may implement a Peripheral Component Interconnect Express (PCIe) interface. The first standard interface control signals may provide a Peripheral Component Interconnect Express (PCIe) interface. The second standard port may implement a Universal Serial Bus (USB) interface. The second standard interface control signals may provide a Universal Serial Bus (USB) interface. The at least one of the first additional interface control signals being connected to the respective at least one of the second additional interface control signals may provide direct communication between the first peripheral board and the second peripheral board. The CPU interface board, the first peripheral board, and the second peripheral board may be included in a processing platform. The processing platform may include a first plurality of connectors on an audio connection side and a second plurality of connectors on a video connection side. The first plurality of connectors and the second plurality of connectors may be for use in connecting the processing platform to one or more devices external to the processing platform. The first plurality of labels may identify the first plurality of connectors. The second plurality of labels may identify the second plurality of connectors. The first plurality of labels may be oriented for readability right-side up along an "y" direction. The second plurality of labels may be oriented for readability right-side up along the "y" direction. The CPU interface board may further include an interface control port including at least one control signal. The at least one of the first additional interface control signals may be connected to the at least one control signal included in the interface control port.

In addition, in another example an apparatus may include a central processing unit (CPU) board including a first standard port, a second standard port, and a plurality of CPU external connectors, a video board including a video augmented interface including first standard interface control signals and video additional interface control signals, and a plurality of video external connectors, the video board configured to plug into the CPU board, and the first standard interface control signals configured to interface to the first standard port, and an audio board including an audio augmented interface including second standard interface control signals and audio additional interface control signals, and a plurality of audio external connectors, the audio board configured to plug into the CPU board, and the second standard interface control signals configured to interface to the second standard port.

Embodiments may include one or more of the following features, alone or in combination with one or more other features. For example, the video additional interface control signals may be connected to the audio additional interface control signals. The connection may allow direct communication between the video board and the audio board. The first standard port may implement a Peripheral Component Interconnect Express (PCIe) interface. The first standard interface control signals may provide a Peripheral Component Interconnect Express (PCIe) interface. The second standard port may implement a Universal Serial Bus (USB) interface. The second standard interface control signals may provide a Universal Serial Bus (USB) interface. The plurality of CPU external connectors, the plurality of video external connectors, and the plurality of audio external connectors connect the apparatus to one or more devices external to the apparatus. The apparatus further includes a mounting bracket coupled to a side of the apparatus. A plurality of video labels may identify the plurality of video external connectors. A plurality of audio labels may identify the plurality of audio external connectors. A plurality of CPU labels may identify the plurality of CPU external connectors. The plurality of video labels, the plurality of audio labels, and the plurality of CPU labels may be oriented for readability right-side up along an "y" direction when the apparatus is mounted using the mounting bracket.

In addition, a method may include receiving, by a central processing unit (CPU) interface board and from a first peripheral board, standard interface control signals included in a first augmented interface on the first peripheral board, the first standard interface control signals being connected to a first standard communications interface included on the CPU interface board, sending, from the first peripheral board and to a second peripheral board, at least one first additional interface control signal included in the first augmented interface on the first peripheral board, the first additional interface control signal being connected to a second additional interface control signal included in a second augmented interface on the second peripheral board, and receiving, by the CPU interface board and from the second peripheral board, second standard interface control signals included in the second augmented interface on the second peripheral module, the second standard interface control signals being connected to a second standard communications interface included on the CPU interface board.

Embodiments may include one or more of the following features, alone or in combination with one or more other features. For example, sending, from the first peripheral board and to the second peripheral board, at least one first additional interface control signal included in the first augmented interface on the first peripheral board can allow for direct communication between the first peripheral board and the second peripheral board.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
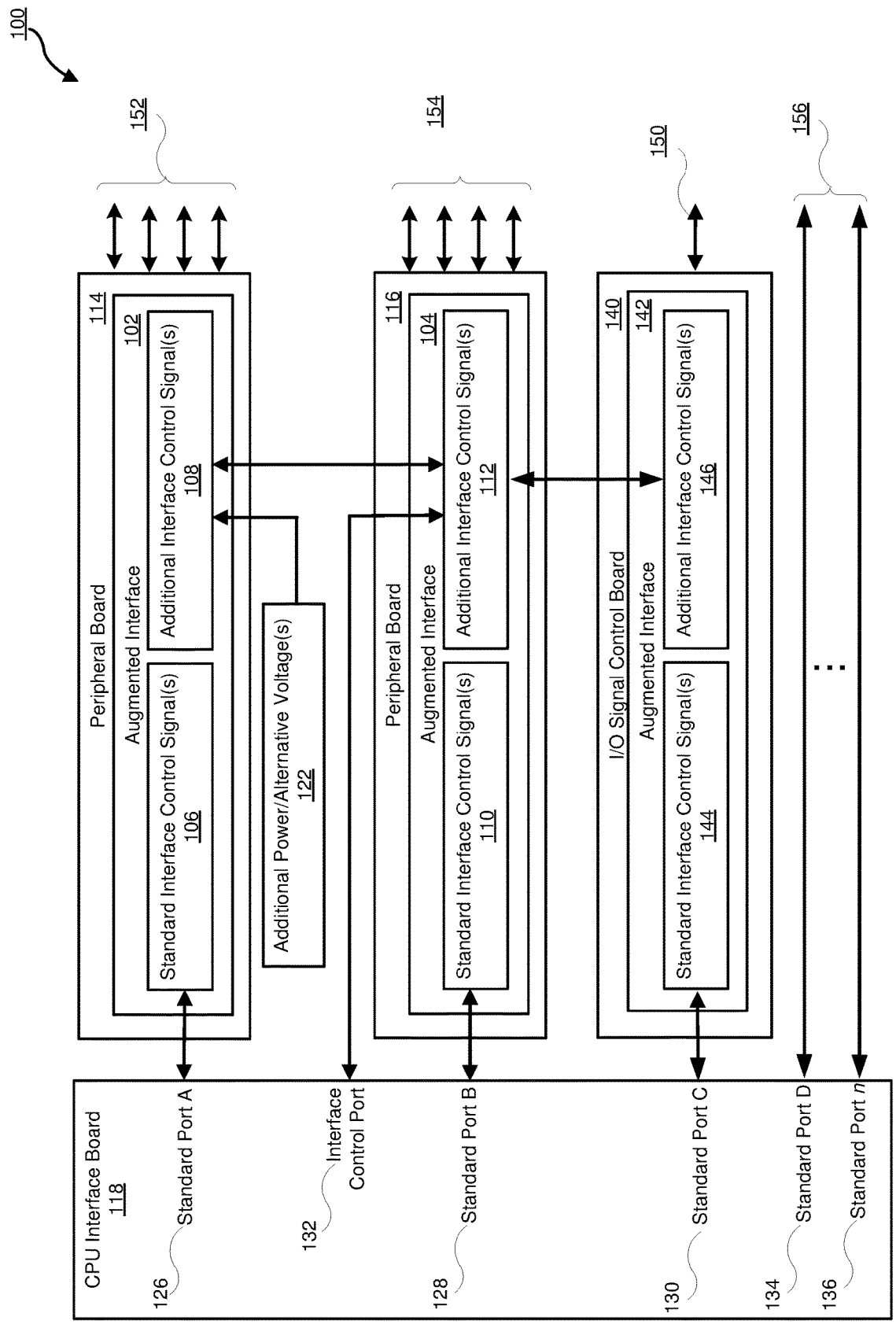
FIG. 1 is a block diagram of an example system showing the use of one or more augmented interfaces.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to providing semi-custom printed circuit boards for use in a mini-PC. The herein disclosed architecture for a mini-PC leverages the use of standard interconnection interfaces between a main PC board and one or more peripheral boards along with additional non-standard features and orthogonal interfaces for use in providing connections between peripheral boards. The peripheral boards may provide additional functionality and customization for the mini-PC.

A standard interconnection interface may incorporate the use of an industry standard computer expansion bus that can incorporate connectors, receptacles, sockets, plugs, pinouts, and control software for providing connections and interfaces between a computer board (e.g., a PC board that includes a CPU or processor) and a peripheral board. Examples of industry standards include Peripheral Component Interconnect (PCI), PCI Express (PCIe), and Universal Serial Bus (USB). An industry standard for a standard interconnection interface may define a connector pin count, a connector type, a connector pinout, and a protocol for providing and receiving data across the interface. The use of an industry standard for a standard connection interface may allow the use of peripheral boards in a computer without the need to customize the connection of the peripheral board to a computer board.

However, though using an industry standard for a standard interconnection interface allows for easy expansion of a computer, it may also limit the number and type of control signals between the computer board and the peripheral board. In addition, or in the alternative, one peripheral board may not easily interface or connect to another peripheral board. In some cases, it may be beneficial to include an additional non-standard or orthogonal interface on a peripheral board that may include additional control signals for use by the computer board and/or for use by another peripheral board. An interface that incorporates these additional control signals may not be a standards-based interface and may be implemented in a custom manner using connectors and additional interface software.

As will be explained in greater detail below, embodiments of the instant disclosure may provide a modular architecture for a mini-PC system, leveraging standard interconnection interfaces while also providing additional functionality and customization by providing additional out-of-band connections for use when implementing customization for the system. In some implementations, a mini-PC may be customized using standard add-in cards plugged into a standard, generic central processing unit (CPU) board (a generic motherboard). In other implementations, a mini-PC may be customized using a fully integrated PC board that includes a CPU and that provides the additional functionality. Each of these implementations have certain drawbacks and benefits. For example, using a fully integrated custom PC board may provide a lower cost mini-PC but involves the design and fabrication of a custom PC board. In another example, a mini-PC can be more easily built using standard add-in cards that plug into a standard, generic mini-PC motherboard. Advantages of the use of plug-in PC boards may be also include easier customization by using the PC boards that provide the desired functionality for the mini-PC while leveraging the use of a generic CPU board.

The modular architecture described herein may provide a mini-PC that may be easily customized while also reducing the cost associated with the use of standard add-in cards along with a standard, generic CPU PC board. The modular architecture described herein uses semi-custom add-in cards along with a semi-custom main CPU PC board. The modular architecture described herein may provide a balance between the customization of the features included in a mini-PC, the ease of providing the features, and the overall cost associated with the providing of the features by leveraging the use of standard interface connections between a main CPU board and peripheral add-in PC boards that provide the desired features. The use of standard interface connections may include using standard connectors and using standard software (e.g., standard application programming interface (API) calls and interfaces) as provided by application(s) and/or an operating system (OS) running on the mini-PC. Leveraging the use of the standard interface connections and standard interface software may allow for the use of third-party devices with the mini-PC. The third-party devices may include, but are not limited to, web cams, digital cameras, disk drives, high-definition televisions (HDTV), tablet computers, fingerprint readers, and small monitors. Leveraging the use of the standard interface connections and standard interface software may provide future flexibility when the standards may be expanded upon or updated.

FIG. 1 is a block diagram of an example system 100 showing the use of one or more augmented interfaces (e.g., augmented interface 102, augmented interface 104, and augmented interface 142). The system 100 includes a central processing unit (CPU) interface board 118, peripheral board 114, peripheral board 116, and input/output (I/O) signal control board 140.

Each augmented interface may include respective standard interface control signals and at least one additional interface control signal. The at least one additional interface control signal is out of the band of the standard interface control signals. Software used to control and interface to the standard interface control signals (e.g., communication protocol software) may be augmented (expanded upon) to provide the control for the at least one additional interface control signal. The augmented interface 102 includes standard interface control signal(s) 106 and additional interface control signal(s) 108. The augmented interface 104 includes standard interface control signal(s) 110 and additional interface control signal(s) 112. The augmented interface 142 may include at least one standard interface control signal (e.g., standard interface control signal(s) 144) and at least one additional interface control signal (e.g., additional interface control signal(s) 146).

A peripheral board and/or an I/O signal control board may connect to, communicate with, and/or interface with a CPU board using the standard interface control signal(s) and one or more of the additional interface control signals. For example, the standard interface control signal(s) 106 may be connected to a standard port (e.g., standard port A 126) included on the CPU interface board 118. In some implementations, a module in memory included on the CPU interface board 118 may include the software and/or firmware used to control and interface to the standard interface control signal(s) 106. In some implementations, a module in memory included on the CPU interface board 118 and a module in memory included on the peripheral board 114 may include the software and/or firmware used to control and interface to the standard interface control signal(s) 106.

For example, the standard interface control signal(s) 110 may be connected to a standard port (e.g., standard port B 128) included on the CPU interface board 118. In some implementations, a module in memory included on the CPU interface board 118 may include the software and/or firmware used to control and interface to the standard interface control signal(s) 110. In some implementations, a module in memory included on the CPU interface board 118 and a module in memory included on the peripheral board 116 may include the software and/or firmware used to control and interface to the standard interface control signal(s) 110.

For example, the standard interface control signal(s) 144 may be connected to a standard port (e.g., standard port C 130) included on the CPU interface board 118. In some implementations, a module in memory included on the CPU interface board 118 may include the software and/or firmware used to control and interface to the standard interface control signal(s) 144. In some implementations, a module in memory included on the CPU interface board 118 and a module in memory included on the I/O signal control board 140 may include the software and/or firmware used to control and interface to the standard interface control signal(s) 144. This will be described in more detail with reference to FIG. 5.

A peripheral board and/or an I/O signal control board may connect to, communicate with, and/or interface with another peripheral board using one or more of the additional interface control signals. The peripheral board and/or the I/O signal control board may connect to another peripheral board and/or another I/O signal control board using a connector that can accommodate the additional interface control signals. The inclusion of additional interface control signal(s) along with standard interface control signal(s) may allow the peripheral boards and/or the I/O signal control boards in a system a way to directly communicate with a CPU board and with one another without the need for a fully custom interface, leveraging communication protocol software used for interfacing with and controlling the standard communicator interface. For example, at least one of the out-of-band additional interface control signal(s) 108 may be connected to a respective at least one of the out-of-band additional interface control signal(s) 112 providing direct communication between the peripheral board 114 and the peripheral board 116. The connection may be accomplished by connecting a connector on the peripheral board 114 to a connector on the peripheral board 116.

For example, at least one of the out-of-band additional interface control signal(s) 112 may be connected to a respective at least one of the out-of-band additional interface control signal(s) 146 providing direct communication between the peripheral board 116 and the I/O signal control board 140. The connection may be accomplished by connecting a connector on the peripheral board 116 to a connector on the I/O signal control board 140. In some implementations, the connectors may be custom connectors. In some implementations, the connectors may be readily available off-the-shelf connectors. In some implementations, circuitry included in the I/O signal control board 140 may be included with other circuitry in the system 100.

In addition, or in the alternative, in some implementations, a peripheral board may also connect to, communicate with, and/or interface with a CPU board using one or more of the additional interface control signal(s). The one or more of the additional interface control signal(s) may provide additional control and/or interface signals that may not be included in a standard interface connection between the CPU board and the peripheral board. For example, additional signals may include reset and enable signals for the peripheral board received from a control board (another peripheral board or the CPU board). For example, at least one of the out-of-band additional interface control signal(s) 112 may be connected to an interface control port A 132 included in the CPU interface board 118. In some implementations, one peripheral board may use the additional interface control signal(s) to interface with multiple peripheral boards and/or one or more CPU boards. In some implementations, buffer circuitry may be included on a peripheral board when implementing a direct connection from and/or to another peripheral board.

A peripheral board (e.g., the peripheral board 114) may also connect to, communicate with, and/or interface with additional power/alternative voltages(s) 122 using one or more of the additional interface control signal(s) (e.g., the additional interface control signal(s) 112). The one or more of the additional interface control signal(s) may provide additional power and/or one or more alternative voltage signals that may not be included in a standard interface connection between the CPU board and the peripheral board. For example, additional power and/or one or more alternative voltage signals may include additional power at an alternative voltage for use by the peripheral board that may be provided by a power supply module, a main module, and/or another board or module included in the system 100. For example, at least one of the out-of-band additional interface control signal(s) 108 may be connected to an additional power signal. For example, at least one of the out-of-band additional interface control signal(s) 108 may be connected to an alternative voltage signal.

An I/O signal control board (e.g., the I/O signal control board 140) may modify (e.g., split, combine, multiplex, demultiplex) signals for input to and/or output from a CPU board (e.g., the CPU interface board 118). For example, the I/O signal control board 140 may receive signals from the CPU interface board from the standard port C 130 as the standard interface control signal(s) 144. The I/O signal control board 140 may combine the standard interface control signal(s) 144 with the additional interface control signal(s) 146 for output by the I/O signal control board at input/output (I/O) port 150. For example, the I/O signal control board 140 may receive signals from the input/output (I/O) port 150. The I/O signal control board 140 may split the received signals into one or more additional interface control signal(s) 146 and the standard interface control signal(s) 144. The I/O signal control board 140 may provide the standard interface control signal(s) 144 to the standard port C 130 of the CPU interface board 118. The I/O signal control board 140 may provide the one or more additional interface control signal(s) 146 to the peripheral board 116.

The peripheral board 114 may provide as output and/or receive as input and input/output (I/O) signals 152. For example, the I/O signals 152 may be one or more output signals that include the standard interface control signal(s) 106 and the additional interface control signal(s) 108. For example, the I/O signals 152 may be one or more input signals that include the standard interface control signal(s) 106 and the additional interface control signal(s) 108. For example, the additional power/alternative voltage(s) 122 may be utilized by the peripheral board 114. In addition, or in the alternative, the additional power/alternative voltage(s) 122 as additional interface control signal(s) 108 may be output, along with the standard interface control signal(s) 106 as I/O signals 152.

The peripheral board 116 may provide as output and/or receive as input and input/output (I/O) signals 154. For example, the I/O signals 154 may be one or more output signals that include the standard interface control signal(s) 110 and the additional interface control signal(s) 112. For example, the I/O signals 154 may be one or more input signals that include the standard interface control signal(s) 110 and the additional interface control signal(s) 112. For example, one or more signals provided by the interface control port A 132 may be utilized by the peripheral board 116. In addition, or in the alternative, the one or more signals provided by the interface control port A 132 as additional interface control signal(s) 112 may be output, along with the standard interface control signal(s) 110 as I/O signals 154.

The CPU interface board 118 may include a plurality of additional standard ports (e.g., standard port D 134, standard port n 136). Each of the additional standard ports may provide input/output (I/O) signals 156. Standard port A 126, standard port B 128, standard port C 130, standard port D 134, and standard port n 136 may implement a Peripheral Component Interconnect Express (PCIe) interface, a Peripheral Component Interconnect (PCI) interface, a Universal Serial Bus (USB) interface, or a serial port interface. For example, the PCIe interface may be one of a PCI Express×1, PCI Express×4, PCI Express×8, and PCI Express×16 interface.

FIG. 1 shows an example system 100. In some implementations, the I/O signal control board 140 may connect to, communication with, and/or interface with the peripheral board 114. For example, the additional interface control signal(s) 146 may connect to, communication with, and/or interface with the additional interface control signal(s) 108.

The example systems described herein may provide four types of interfaces for use in systems that include enhanced boards and modules. A first type of interface, shown for example as the additional power/alternative voltages(s) 122 in FIG. 1, may provide additional power and/or alternative voltages to a board or module by using, connecting to, and/or interfacing with out-of-band additional interface control signal(s) included on the board or module.

A second type of interface, shown for example as the direct communication between the additional interface control signal(s) 108 and the additional interface control signal(s) 112 (and shown for example as the direct communication between the additional interface control signal(s) 112 and the additional interface control signal(s) 146) in FIG. 1, may provide direct communication of as out-of-band additional interface control signal(s) between boards and/or modules.

A third type of interface, shown for example as the direct communication between the additional interface control signal(s) 112 and the interface control port A 132 in FIG. 1, may provide additional control to the boards and/or modules described herein that implement and include augmented interfaces.

A fourth type of interface, shown for example as the I/O signal control board 140 in FIG. 1, may split, combine, multiplex or demultiplex input/output signals. For example, the fourth type of interface may combine out-of-band additional interface control signal(s) with other signals for output. In another example, the fourth type of interface may separate out or split out input signals and provide the separated-out signals as out-of-band additional interface control signal(s).

Figure 2:
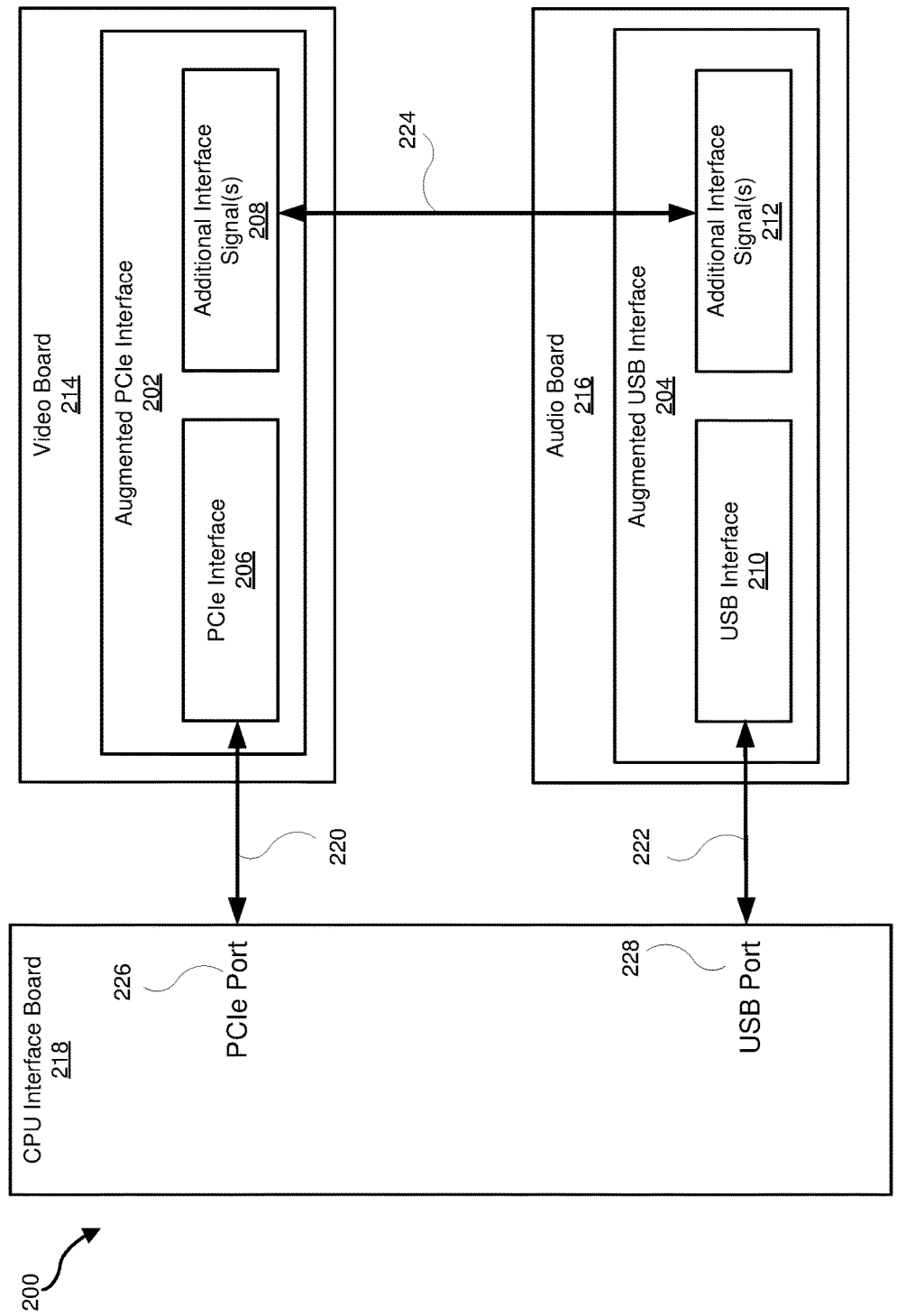
FIG. 2 is a block diagram of an example system showing an augmented Peripheral Component Interconnect Express (PCIe) interface and an augmented Universal Serial Bus (USB) interface.

FIG. 2 is a block diagram of an example system 200 showing an augmented Peripheral Component Interconnect Express (PCIe) interface 202 and an augmented Universal Serial Bus (USB) interface 204. The system 200 includes a central processing unit (CPU) interface board 218. A video board 214 (which may also be referred to as a video capture module) includes the augmented PCIe interface 202. An audio board 216 (which may also be referred to as an audio capture module and amplifier) includes the augmented USB interface 204.

The augmented PCIe interface 202 may include standard PCIe interface control signals (e.g., the PCIe interface 206) and at least one additional interface control signal (e.g., additional interface signals 208) that may be considered out-of-band signals (e.g., signals that are not included in the PCIe standard connection or interface (e.g., the PCIe interface 206)). The augmented USB interface 204 may include standard USB interface control signals (e.g., the USB interface 210) and at least one additional interface control signal (e.g., additional interface signal(s) 212) that may be considered out-of-band signals (e.g., signals that are not included in the USB standard connection or interface (e.g., the USB interface 210)).

The video board 214 may connect to, communicate with, and/or interface with the CPU interface board 218 using standard PCIe interface control signal(s) by way of the PCIe interface 206 (e.g., connection 220) coupled to or connected to a PCIe port 226 included on the CPU interface board 218. The video board 214 may connect to, communicate with, and/or interface with the CPU interface board 218 using standard PCIe interface software and/or firmware controls. The audio board 216 may connect to, communicate with, and/or interface with the CPU interface board 218 using standard USB interface control signal(s) by way of the USB interface 210 (e.g., connection 222) coupled to or connected to a USB port 228 included on the CPU interface board 218. The audio board 216 may connect to, communicate with, and/or interface with the CPU interface board 218 using standard USB interface software and/or firmware. Each additional interface signal(s) 208 may be connected to, coupled to, and/or otherwise interfaced with a respective additional interface signal(s) 212 allowing for a direct interface between the audio board 216 and the video board 214 (e.g., connection 224). The direct interface between the audio board 216 and the video board 214 may allow for direct communication between the peripheral boards without the need to pass communications between the two boards through the CPU interface board 218.

Direct communication between the video board 214 and the audio board 216 may be accomplished faster than providing the communication indirectly by way of the CPU interface board 218. In some cases, the speed of the communication between the video board 214 and the audio board 216 may affect a user experience. For example, the additional interface signal(s) 208 may pass audio data to the additional interface signal(s) 212 included in the audio board 216. The audio data may be synchronized with video data (display data). The audio board 216 may provide the audio data to one or more speakers while the video board 214 may provide the display data to a display device.

In some implementations, as described herein, a custom PC board may include a CPU along with audio and video capabilities providing a low-cost solution. In some implementations, as described herein, plugin boards that do not include additional interface signals may be used with a generic CPU board providing a modular but higher cost solution as the design of the plugin boards and the generic CPU board take into account the video and audio criteria for the mini-PC. The modular architecture described herein that includes the use of plugin boards with out-of-band signal interfaces provides modularity with the use of plugin boards while satisfying the video and audio criteria for the mini-PC.

In some implementations, the connection 224 may be accomplished by connecting a connector on the video board 214 to a connector on the audio board 216. In some implementations, the connectors may be custom connectors. In some implementations, the connectors may be readily available off-the-shelf connectors.

Though the example system 200 includes an augmented PCIe interface 202, other types of PCI standard interfaces may also be augmented, including but not limited to, a peripheral component interconnect interface (PCI). The augmented PCIe interface includes augmenting PCI Express×1, PCI Express×4, PCI Express×8, and PCI Express×16 interfaces. The augmented PCIe interface 202 may support PCIe standards from PCI Express 1.0 to PCI Express 5.0 and any future PCI Express versions.

The augmented USB interface 210 may use a particular type of USB connector for the USB interface 210. The types of USB connector that may be used for the USB interface 210 may include, but is not limited to, a USB Type A connector, a USB Type B connector, a USB Mini A connector, a USB Mini B connector, a USB mini AB connector, a USB micro B connector, a USB micro AB connector, and a USB Type c connector. The software protocol for interfacing to the augmented USB interface for controlling the USB interface 210 may include, but is not limited to, USB 1.0, USB 2.0, USB 3.0, USB 3.1, and USB 3.2. The software protocol may be selected based on the type pf USB connector used to implement the USB interface 210.

Other examples of standard interfaces that may be augmented can include, but are not limited to, serial communication protocols (e.g., RS-232, RS-422), Ethernet, (Inter-Integrated Circuit) I2C, and Serial Advanced Technology Attachment (SATA).

Figure 3:
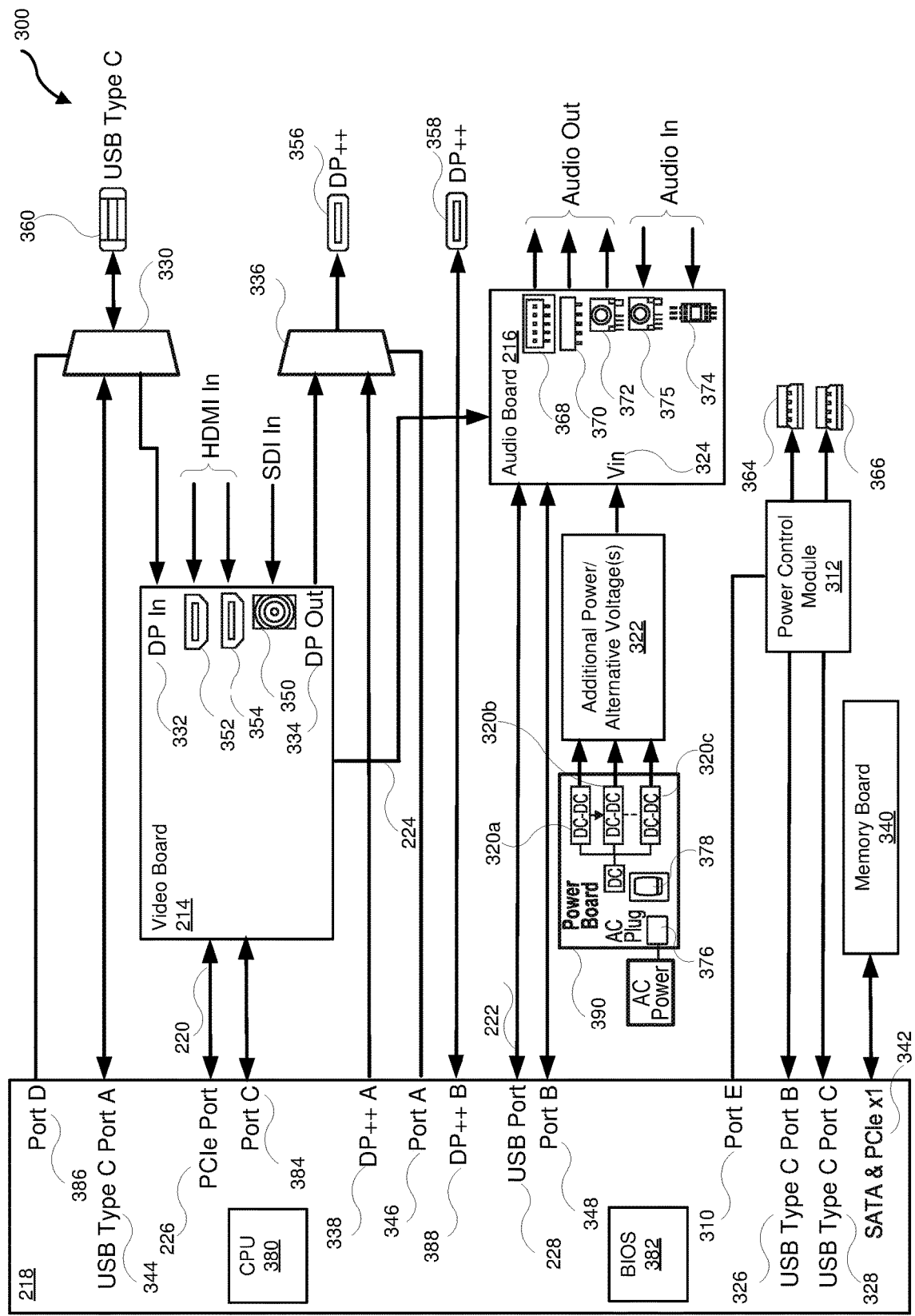
FIG. 3 is a block diagram of an example system that includes a video board, an audio board, and a Central Processing Unit (CPU) interface board.

FIG. 3 is a block diagram of an example system 300 that includes, referring to FIG. 2, the video board 214, the audio board 216, and the CPU interface board 218. The example system 300 may be used as a basis for a mini-PC.

Referring to FIG. 2, the video board 214 may include components (electrical circuits and integrated circuits (ICs)) for implementing video input, video output, and video control in the system 300. The video board 214 may include one or more connectors for connecting to and interfacing with components and devices for use with the system 300. For example, the video board 214 may include a serial digital interface (SDI) connector 350, a High-Definition Multimedia Interface (HDMI) connector 352, and an HDMI connector 354. The video board 214 may include a PCIe interface 206 that uses, for example, a PCIe×4 connector for connecting to and interfacing with the CPU interface board 218 by way of the connection 220 to the PCIe port 226 implemented using, for example, a PCIe×4 connector. In some implementations, a ribbon cable may be used as the connection 220 between the PCIe interface 206 and the PCIe port 226. In some implementations, the PCIe port 226 may include a PCIe×4 connector/receptacle that interfaces with a PCIE×4 receptacle/connector for the PCIe interface 206 providing the connection 220.

Referring to FIG. 2, the audio board 216 may include components (electrical circuits and integrated circuits (ICs)) for implementing audio input, audio output, and audio control in the system 300. The audio board 216 may include one or more connectors for connecting to and interfacing with components and devices for use with the system 300. For example, the audio board 216 may include one or more speaker out connectors (e.g., speaker out connector 368), one or more line out connectors (e.g., line out connector 370), one or more audio headset connectors (e.g., headset output connector 372 and headset microphone input connector 375), and one or more microphone-in connectors (e.g., microphone-in connector 374)

Referring to FIG. 2, the audio board 216 may include a USB interface 210 that uses, for example, a USB connector for use in implementing USB 2.0 communications for connecting to and interfacing with the CPU interface board 218 by way of the connection 222 to the USB port 228. In some implementations, a ribbon cable may be used as the connection 222 between the USB interface 210 and the USB port 228. In some implementations, the USB port 228 may include a USB connector/receptacle that interfaces with a USB receptacle/connector for the USB interface 210.

The video board 214 may directly connect to and interface with the audio board 216 (and the audio board 216 may directly connect to and interface with the video board 214) by way of the connection 224. For example, the video board 214 may output (provide) audio information (signals) to the audio board 216 in the form of one or more of the additional interface signal(s) 208. Each of the output audio signals may be connected to a respective signal included in the additional interface signals 212. In addition, or in the alternative, the audio board 216 may output (provide) information (signals) to the video board 214 in the form of one or more of the additional interface signal(s) 212. Each of the output information signals from the audio board 216 may be connected to a respective signal included in the additional interface signals 208.

The additional interface signal(s) 208 included on the video board 214 may use an off-the-shelf connector for connecting to and interfacing with another off-the-shelf connector for the additional interface signal(s) 212 included on the audio board 216. The additional interface signal(s) 208 included on the video board 214 may use custom connector for connecting to and interfacing with another custom connector for the additional interface signal(s) 212 included on the audio board 216. In some implementations, a ribbon cable may be used as the connection 224 between the additional interface signal(s) 208 and the additional interface signal(s) 212.

The CPU interface board 218 may connect to and/or interface with a memory board 340 using a SATA & PCIe×1 connection 342. The system 300 may include one or more additional connections for connecting to and interfacing with external components and devices. The additional connections may include a USB Type C connection 360, a first Display Port (DP) connection (e.g., DP++ connection 356), a second DP connection (e.g., DP++ connection 358), a USB Type 3.0 connection 364, and a USB Type 3.0 connection 366. In some implementations, a DP++ connection may transmit Digital Visual Interface (DVI)/High Definition Multimedia Interface (HDMI) signals as well as DisplayPort (DP) signals. In some implementations, a DisplayPort (DP) connection may transmit DP signals and may need an adapter to convert the DP signals to DVI/HDMI signals.

The system 300 may include a power board 390 that may include an AC plug 376 and a switch 378. The power board 390 may include DC-to-DC converters 320a-c that output respective DC voltages for input to an additional power/alternative voltage(s) module 322. An output of the additional power/alternative voltage(s) module 322 may be input to a Vin input 324 included in the audio board 216. The additional power/alternative voltage(s) module 322 may be the additional power/alternative voltage(s) module 122 as shown in FIG. 1. In some implementations, the audio board 216 may include multiple (two or more) Vin inputs to receive multiple (two or more) voltage outputs from the additional power/alternative voltage(s) module 322. The additional power/alternative voltage(s) module 322 may provide a first type of interface, as described herein, to the system 300 by providing additional power and/or alternative voltages to the audio board 216 from the power board 390. The Port B 348 may be input to the audio board 216 and may act as a control for selecting the use of the output of the additional power/alternative voltage(s) module 322 by the audio board 216 when a first type of interface, as described herein, is provided to the system 300.

The CPU interface board 218 may include a CPU 380 and a BIOS 382. The system 300 may include a Port A 346, a Port B 348, a Port C 384, a Port D 386, and a Port E 310. The Port A 346, the Port B 348, the Port C 384, the Port D 386, and/or the Port E 310 may be interface control ports. The Port A 346, the Port B 348, the Port C 384, the Port D 386, and/or the Port E 310 may be one of an I2C connection, a 2G Ethernet connection, or a serial communication connection. The Port A 346, the Port B 348, the Port C 384, the Port D 386, and/or the Port E 310 may be connected to and/or interfaced with circuits and/or components included in the system 300. In some implementations, standard interface connections to other boards and modules included in the system 300 (e.g., the memory board 340) may also utilize augmented communication interfaces.

A multiplexer/demultiplexer circuit 330 may interface with a USB Type C interface by way of the USB Type C connection 360. In some implementations, the USB Type C interface may connect to and/or interface with a USB Type C Port A 344 included on the CPU interface board 218. The Port D 386 may be input to the multiplexer/demultiplexer circuit 330 and may act as a control signal. In some implementations, the Port D 386 may enable an interface/connection between the USB Type C connection 360 and the USB Type C port A 344 included on the CPU interface board 218. In some implementations, the Port D 386 may instead enable an interface/connection between the USB Type C connection 360 and a DP In input 332 on the video board 214 in cases where the USB Type C connection 360 is configured to implement an alternate mode that may provide video information and data (e.g., image and audio data) as DisplayPort signals. The Port D 386 may provide a fourth type of interface, as described herein, to the system 300 by providing the signal from the USB Type C connection 360 as either an I/O connection to the USB Type C Port A 344 or as DisplayPort signals to the DP In input 332.

The Port C 384 may be an interface control port that includes one or more signals provided by the CPU interface board 218 to the video board 214 for use in interfacing with and/or controlling one or more functions provided by the video board 214. In addition, or in the alternative, the Port C 384 may be an interface control port that includes one or more signals provided by the CPU interface board 218 to the video board 214 for use in controlling one or more circuits included on the video board 214. For example, the Port C 384 may provide one or more signals to the video board 214 for resetting the video board 214. In another example, the Port C 384 may provide one or more signals to the video board 214 for controlling power on the video board 214. In another example, the Port C 384 may be a serial port that implements a serial interface with the video board 214 that uses serial communications protocols. In another example, the Port C 384 may be an Ethernet port that implements an Ethernet interface with the video board 214. In this example, in some implementations, the video board 214 may then be enabled to provide the Ethernet interface. In another example, the Port C 384 may be an I2C port that implements an I2C interface with the video board 214. The Port C 384 may provide a third type of interface, as described herein, to the system 300 by providing additional signals and controls to the video board 214. FIG. 3 shows the Port C 384 connected to/interfaced with the video board 214. In some implementations, more than one (two or more, three or more) port may be provided by the CPU interface board 218 for connection to the video board 214, therefore, providing multiple control signals to the video board 214.

Referring to FIG. 2, the video board 214 may output (provide) the audio data as audio signal(s) by way of the connection 224 to the audio board 216 in the form of one or more of the additional interface signal(s) 208. The connection 224 may provide a second type of interface, as described herein, to the system 300.

The video board 214 may output DisplayPort signals from a DP Out output 334. For example, the video board 214 may receive the DisplayPort signals at the DP IN input 332 and then may provide them for output at the DP out output 334. The signals output from the DP Out output 334 may be input to a multiplexer/demultiplexer circuit 336 for output to the DP++ connection 356. A DP++ A output 338 of the CPU interface board 218 may be input to the multiplexer/demultiplexer circuit 336 also for output to the DP++ connection 356. The Port A 346 may be input to the multiplexer/demultiplexer circuit 336 and may act as a control for enabling either the DP Out output 334 or the DP++ A output 338 of the CPU interface board 218 for output to the DP++ connection 356. The Port A 346 may provide a fourth type of interface, as described herein, to the system 300.

The CPU interface board 218 may include a USB Type C Port B 326 and a USB Type C Port C 328. The USB Type C Port B 326 and the USB Type C Port C 328 may be input to and/or output from a power control module 312 that may provide connections to the USB Type 3.0 connection 364, and the USB Type 3.0 connection 366, respectively. A Port E 310 may be input to the power control module 312 and may act as a control for enabling USB power delivery on either or both of the USB Type C Port B 326 and the USB Type C Port C 328. In some implementations, the USB power delivery may be from a USB Type C port on the CPU interface board to a USB Type 3.0 connection (e.g., providing power external to the system 300). In some implementations, the USB power delivery may be from a USB Type 3.0 connection to a USB Type C port on the CPU interface board (e.g., providing power to the system 300). The Port E 310 may provide a fourth type of interface, as described herein, to the system 300.

A DP++ B output 388 may be directly connected/interfaced to the DP++ connection 358.

As described herein, the system 300 may include one or more of four types of interfaces. The first type of interface may provide additional power and alternative voltage(s) to the audio board 216 from the power board 390. The second type of interface may provide a direct audio link from the video board 214 to the audio board 216. The third type of interface may provide one or more of (i) reset and/or power control signals for the audio board 216, (ii) reset and/or power control signals for the video board 214, (iii) a serial port interface from the CPU interface board 218 to the video board 214, (iv) an I2C interface from the CPU interface board 218 to the video board 214, and (v) an Ethernet interface that may be switched from the CPU interface board 218 to the video board 214. The fourth type of interface may provide one or more of (i) selecting DP++ signals for output to a DP++ output connection from either the CPU interface board 218 or the video board 214, (ii) splitting out of the DisplayPort signals from the USB Type C connection 360 for input to the video board 214, and providing the USB communication signals from the USB Type C connection 360 to the USB Type C Port A 344 on the CPU interface board 218, (iii) controlling the USB interface between the USB Type C Port B 326 and the USB Type 3.0 connection 364 for power delivery, and (iv) controlling the USB interface between the USB Type C Port C 328 and the USB Type 3.0 connection 366 for power delivery.

Figure 4:
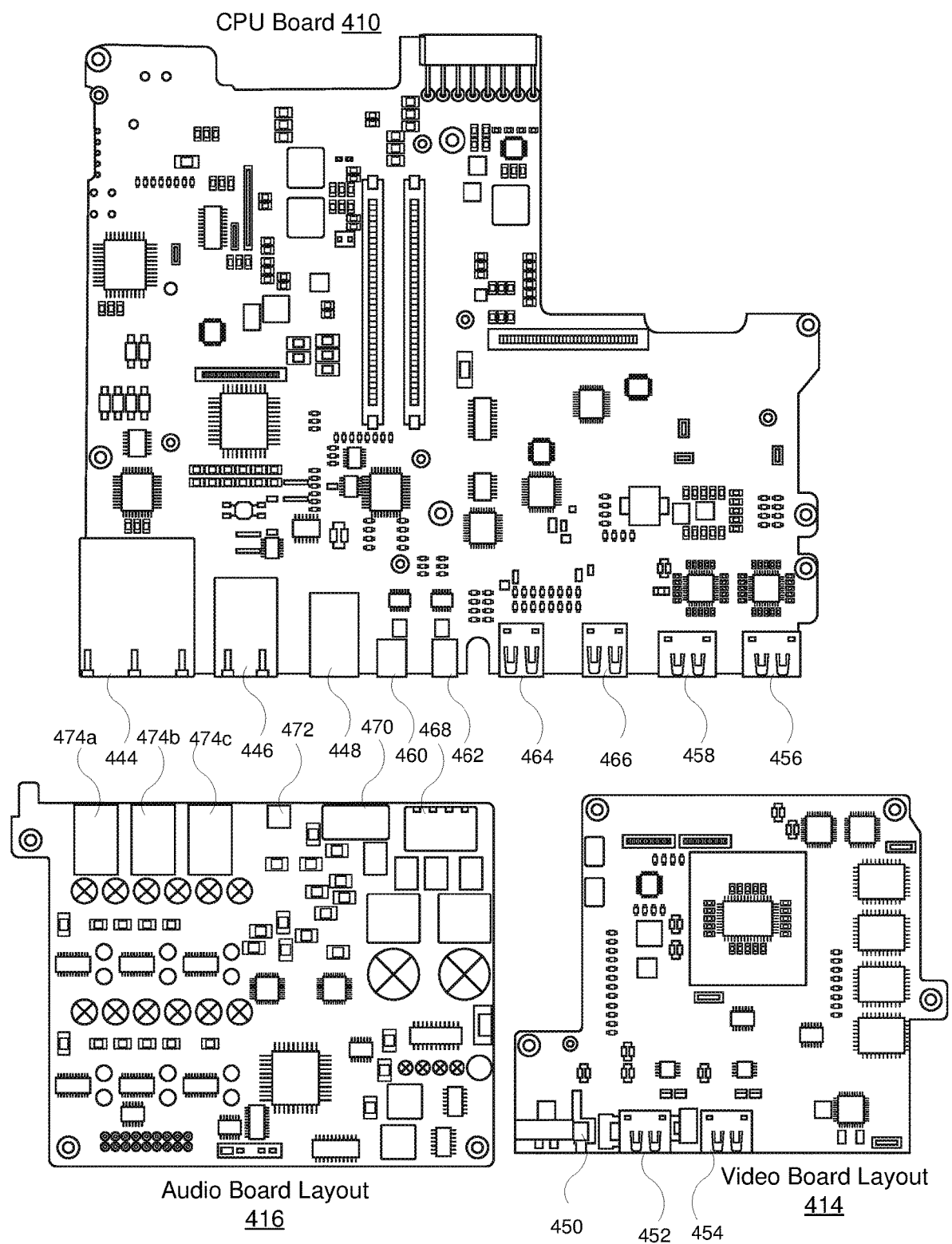
FIG. 4 is a diagram showing printed circuit boards for including in a mini-PC that implements augmented interfaces.

FIG. 4 is a diagram showing printed circuit boards for including in a mini-PC that implements augmented interfaces. FIG. 4 includes an audio board layout 416 for the audio board 216 as shown with reference to FIGS. 2 and 3. FIG. 4 includes a video board layout 414 for the video board 214 as shown with reference to FIGS. 2 and 3. For example, the CPU board 410 may include the circuitry shown in FIG. 3 along with the circuitry and connectors included in the CPU interface board 218.

For example, the audio board layout 416 may include one or more microphone-in connectors (e.g., microphone-in connectors 474a-c), one or more headset output connectors (e.g., headset output connector 472), one or more line out connectors (e.g., line out connector 470), and one or more speaker out connectors (e.g., speaker out connector 468). The video board layout 414 may include one or more serial digital interface (SDI) connectors (e.g., SDI connector 450, and one or more High-Definition Multimedia Interface (HDMI) connectors (e.g., HDMI connector 452 and HDMI connector 454). The CPU board 410 may include one or more 4×Ethernet 100/1 Gigabit Ethernet (Gbe) base T connectors (e.g., 4×Ethernet 100/1 Gbe base T connector 444), one or more one Gigabit per second (Gbps) Power Over Ethernet (POE) connectors (e.g., one Gbps POE connector 446), one or more serial communication connectors (e.g., serial communication connector 448), one or more USB Type C connections (e.g., USB Type C connection 460 and USB Type C connection 462), one or more USB Type 3.0 connectors (e.g., USB Type 3.0 connector 464 and USB Type 3.0 connector 466), and one or more Display Port (DP) connectors (e.g., DP++ connector 456 and DP++ connector 458).

Figure 5:
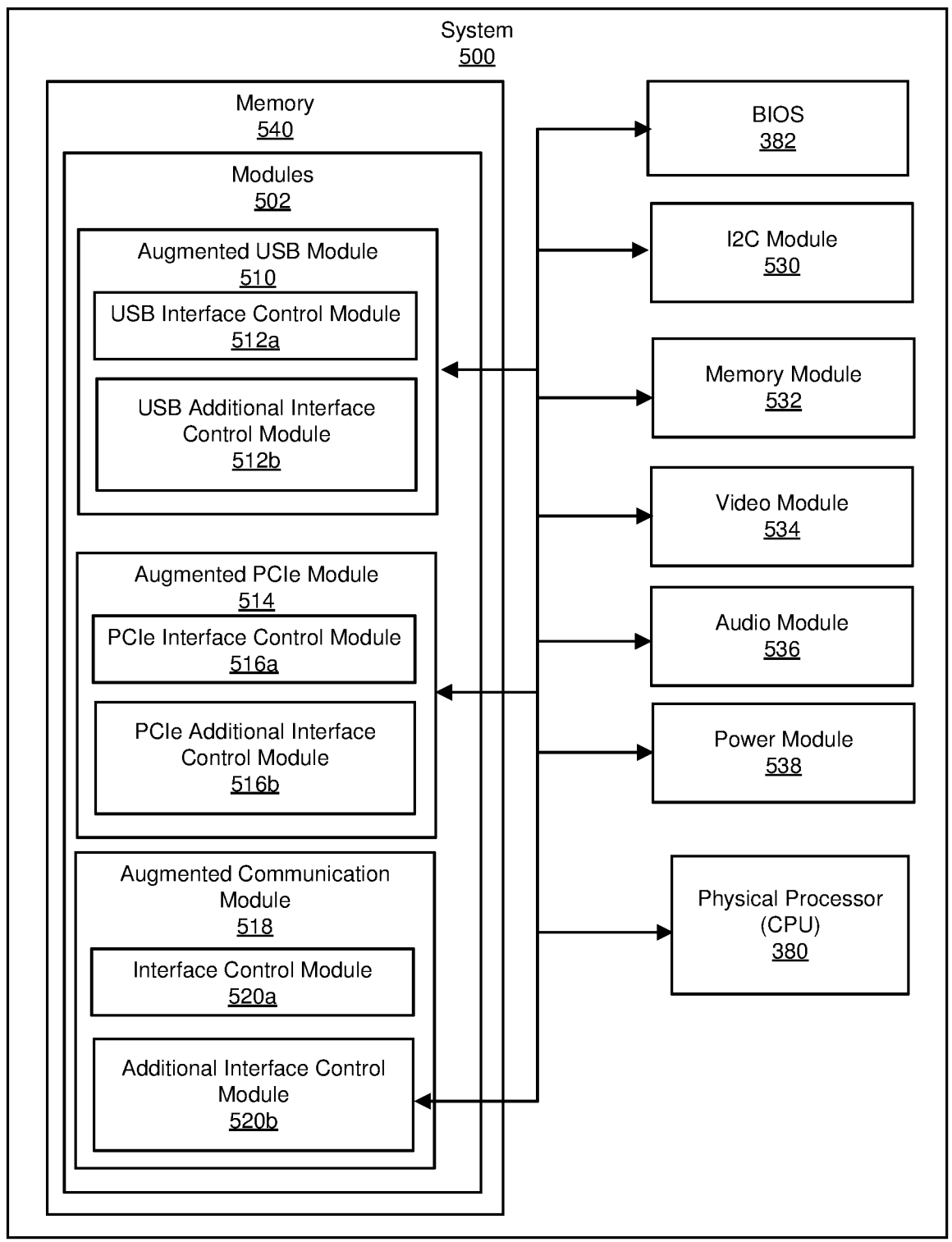
FIG. 5 is a block diagram of an example system that includes modules for use in an example system for implementing a mini-PC.

FIG. 5 is a block diagram of an example system 500 that includes modules for use in the example system 300 for implementing a mini-PC. For example, referring to FIG. 3, the system 500 may include the BIOS 382 and the CPU 380 (e.g., one or more physical processors). The system 500 may include a memory 540 that may include one or more modules 502. The modules 502 may include software and/or firmware for controlling corresponding hardware interfaces, connections, and buses as shown in FIG. 3.

An augmented USB module 510 may include a USB interface control module 512a and a USB additional interface control module 512b. Referring for example to FIG. 2, the augmented USB module 510 may provide software and/or firmware control for an augmented USB interface (e.g., the augmented USB interface 204). The USB interface control module 512a may provide the software and/or firmware control for a standard USB interface (e.g., the standard USB interface 210). The USB interface control module 512a may include software, firmware, and/or operating system level code for controlling standard USB interfaces and connections as described herein. The USB additional interface control module 512b may provide the software and/or firmware control for out-of-band connections (e.g., additional interface signal(s) 212) associated with the augmented USB interface 204 as described herein.

Referring to FIG. 3, the USB interface control module 512a may provide the controls for output by the CPU interface module 218 by way of Port E 310 for controlling the power control module 312 as described herein. In addition, or in the alternative, the USB interface control module 512a may provide the controls for output by the CPU interface module 218 by way of Port B 348 for controlling the audio board 216 as described herein. In addition, or in the alternative, the USB interface control module 512a may provide the controls for output by the CPU interface module 218 by way of Port D 386 for controlling the multiplexer/demultiplexer circuit 330 as described herein.

An augmented PCIe module 514 may include a PCIe interface control module 516a and a PCIe additional interface control module 516b. Referring for example to FIG. 2, the augmented PCIe module 514 may provide software and/or firmware control for an augmented PCIe interface (e.g., the augmented PCIe interface 202). The PCIe interface control module 516a may provide the software and/or firmware control for a standard PCIe interface (e.g., the standard PCIe interface 206). The PCIe interface control module 516a may include software, firmware, and/or operating system level code for controlling standard PCIe interfaces and connections as described herein. The PCIe additional interface control module 516b may provide the software and/or firmware control for out-of-band connections (e.g., additional interface signal(s) 208) associated with the augmented PCIe interface 202 as described herein.

Referring to FIG. 3, the PCIe interface control module 516a may provide the controls for output by the CPU interface module 218 by way of Port C 384 for controlling the video board 214 as described herein.

An augmented communication module 518 may include a communication interface control module 520a and a communication additional interface control module 520b. Referring for example to FIG. 1, the augmented communication module 518 may provide software and/or firmware control for an augmented communication interface (e.g., the augmented interface 102 and/or the augmented interface 104). The communication interface control module 520a may provide the software and/or firmware control for a standard communication interface (e.g., the standard interface control signal(s) 106 and/or the standard interface control signal(s) 110). The communication interface control module 520a may include software, firmware, and/or operating system level code for controlling standard communication interfaces and connections as described herein. The additional interface control module 520b may provide the software and/or firmware control for out-of-band connections (e.g., additional interface control signal(s) 108 and/or additional interface control signal(s) 112) associated with the augmented interface 102 and/or the augmented interface 202, respectively, as described herein.

Referring to FIG. 3, the additional interface control module 520b may provide the controls, by way of the Port C 384, for the direct communication of the audio signals from the video board 214 to the audio board 216.

Referring to FIG. 3, the system 500 may include a I2C module 530 that may include software and/or firmware for implementing and controlling an I2C connection and/or interface. The system 500 may include a memory module 532 that may include software and/or firmware for accessing and controlling the memory board 340. The system 500 may include a video module 534 that may include software and/or firmware for accessing and controlling the functions of the video board 214. The system 500 may include an audio module 536 that may include software and/or firmware for accessing and controlling the functions of the audio board 216. The system 500 may include a power module 538 that may include software and/or firmware for accessing and controlling the functions of the power board 390.

FIGS. 6A-G are diagrams showing example views of a processing platform 600 for use as a mini-PC. For example, the processing platform 600 may be used for media-centric applications that may include, but are not limited to, video conferencing. The processing platform 600 may be used as a central hub for multiple devices included in a location, such as a room. The use of the processing platform 600 for controlling multiple devices for use in a video conference may consolidate the video conferencing delivery and control into fewer control boxes. The processing platform 600 may centralize and consolidate the functionality of the multiple devices. In some implementations, multiple processing platforms may be used to provide scalability for the media-centric applications (e.g., multiple (e.g., tens, hundreds, thousands) of meeting rooms and/or meeting spaces).

Figure 6A:
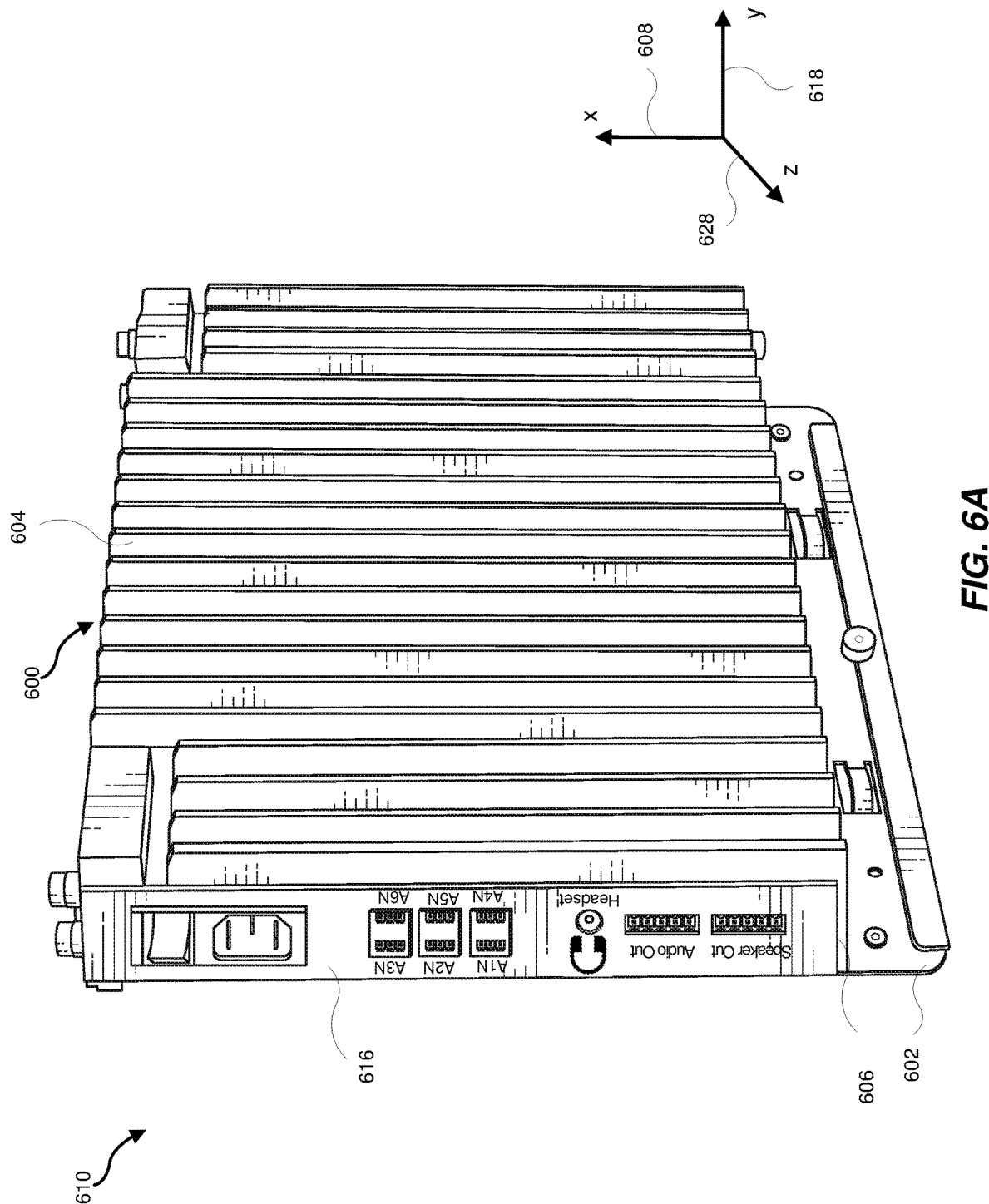
FIG. 6A shows a first view of a processing platform that may include a mounting bracket, a heat sink, and an enclosure that may include PC boards, interfaces, connectors, and one or more power supplies as described herein.
Figure 6B:
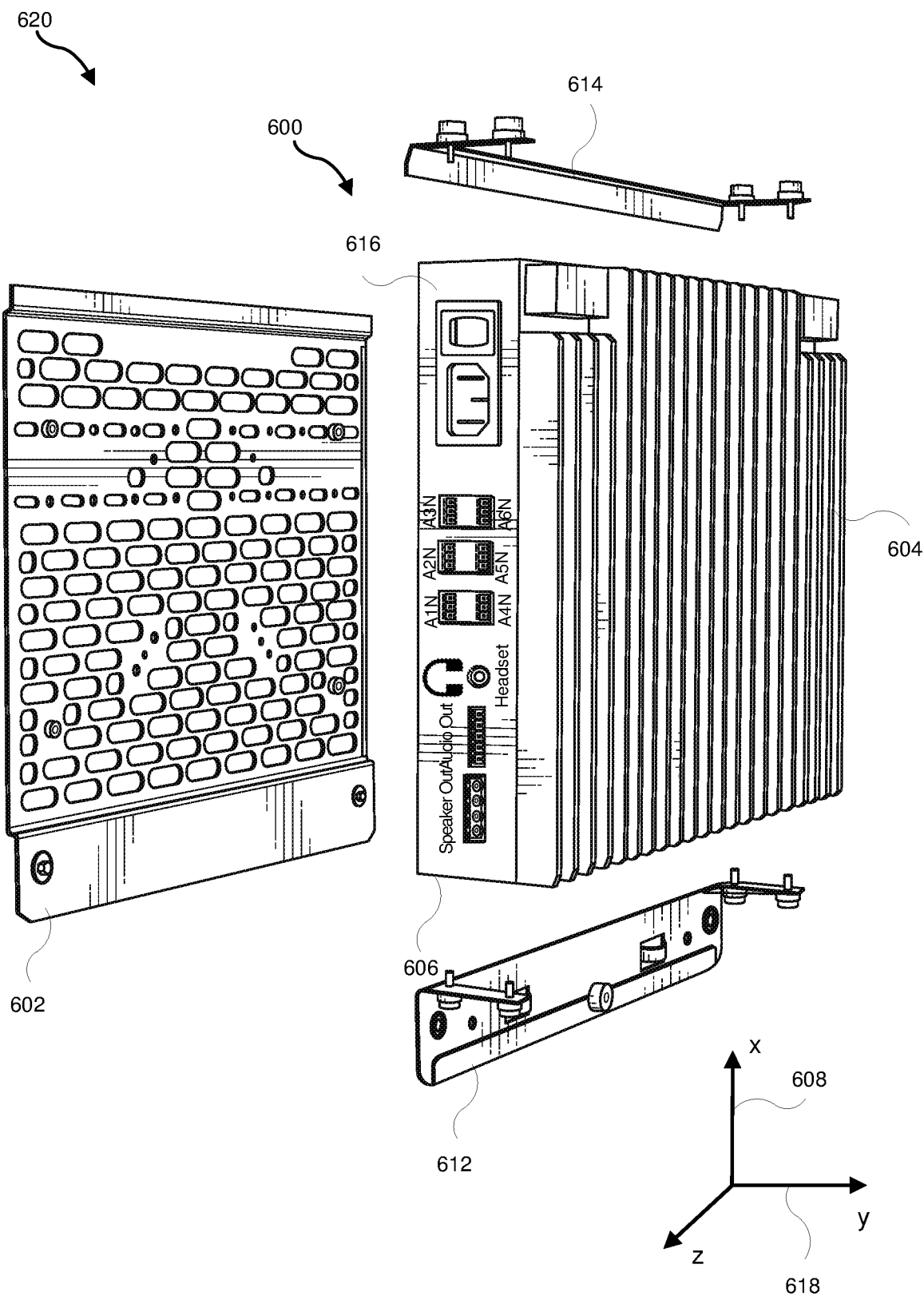
FIG. 6B shows a second view of the processing platform that includes additional details for mounting the processing platform such as a lower mounting bracket and an upper mounting bracket.

For example, referring to FIGS. 2-5, the processing platform 600 may include the example system 300. FIG. 6A shows a first view 610 of the processing platform that may include a mounting bracket 602, a heat sink 604, and an enclosure 606 (e.g., a box) that may include PC boards, interfaces, connectors, and one or more power supplies as described herein. FIG. 6B shows a second view 620 of the processing platform that includes additional details for mounting the processing platform such as a lower mounting bracket 612 and an upper mounting bracket 614.

FIGS. 6A-B show the processing platform 600 in an orientation such that the mounting bracket 602 is parallel to an "x" axis 608 (e.g., an "x" direction) and perpendicular to a "y" axis 618 (e.g., a "y" direction). In the orientation shown in FIGS. 6A-B, the processing platform 600 is placed in an orientation suitable for mounting on a flat surface such as a wall. For example, in the orientation shown in FIGS.

6A-B, the processing platform 600 may be mounted to a wall behind a display device (e.g., an HDTV) in a conference room.

Figure 6C:
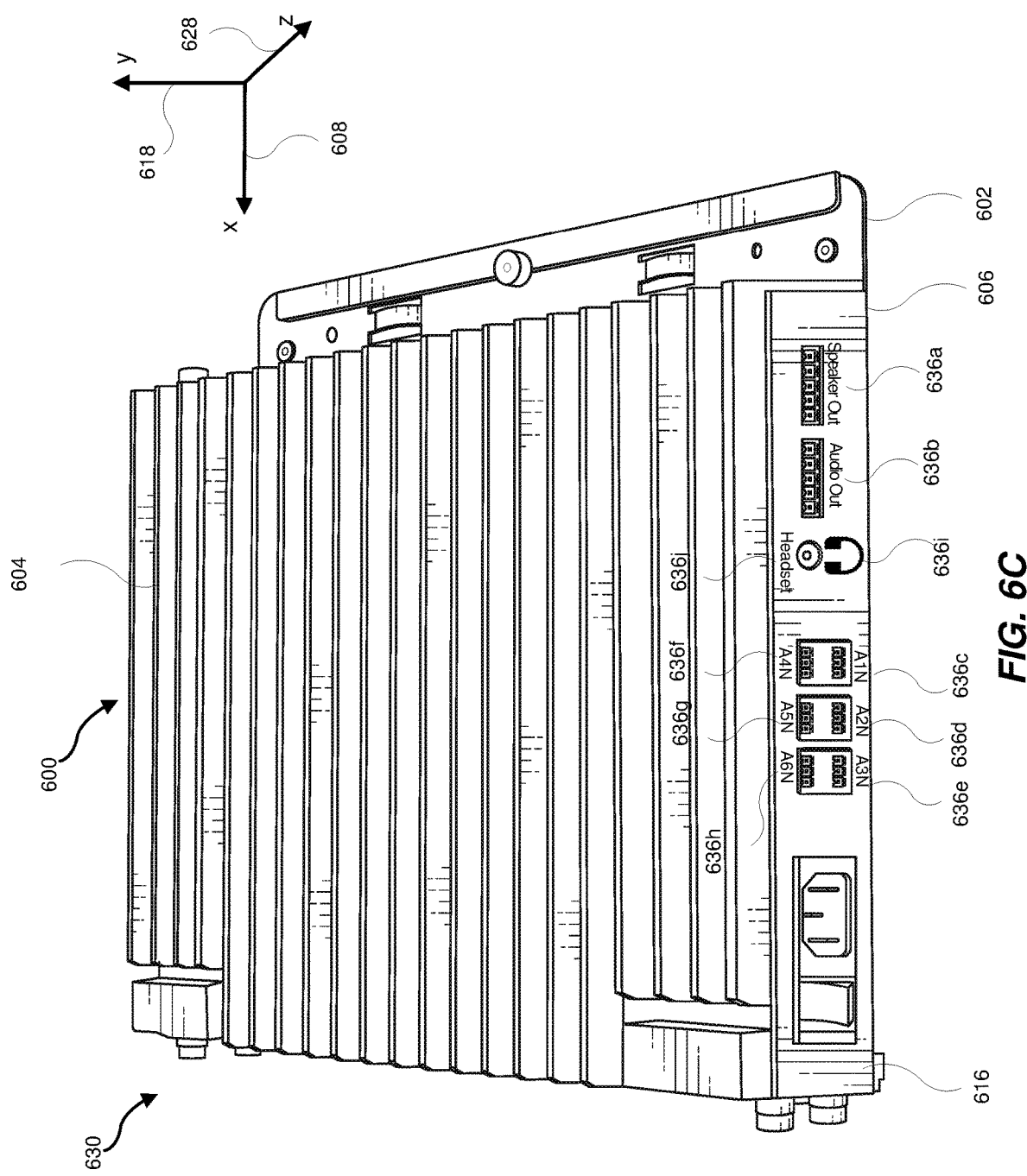
FIG. 6C shows a third view of the processing platform.

FIG. 6C shows a third view 630 of the processing platform 600. FIGS. 6A-C show the processing platform 600 in an orientation aligned with a "z" axis 628 (e.g., a "z" direction) such that an audio connection side 616 is facing forward. For example, when the processing platform is placed in the orientation as shown in FIG. 6C, the reading of any graphics or text included as labels (e.g., labels 636*a-j*) for the various connectors included in the audio connection side 616 of the processing platform 600 may be difficult to read as they may be inverted or upside-down based on the mounting of the PC boards that include the connectors within the processing platform 600. The text included in the labels 636*a-j* may be upside-down and backwards relative to the "y" axis 618 (the "y" direction). When placed in the orientation as shown in the first view 610 in FIG. 6A and, for example, mounted on a wall behind a HDTV, it may be difficult to read the labels for the various connectors if they are printed in an orientation that is upside-down when viewed by a user.

Figure 6D:
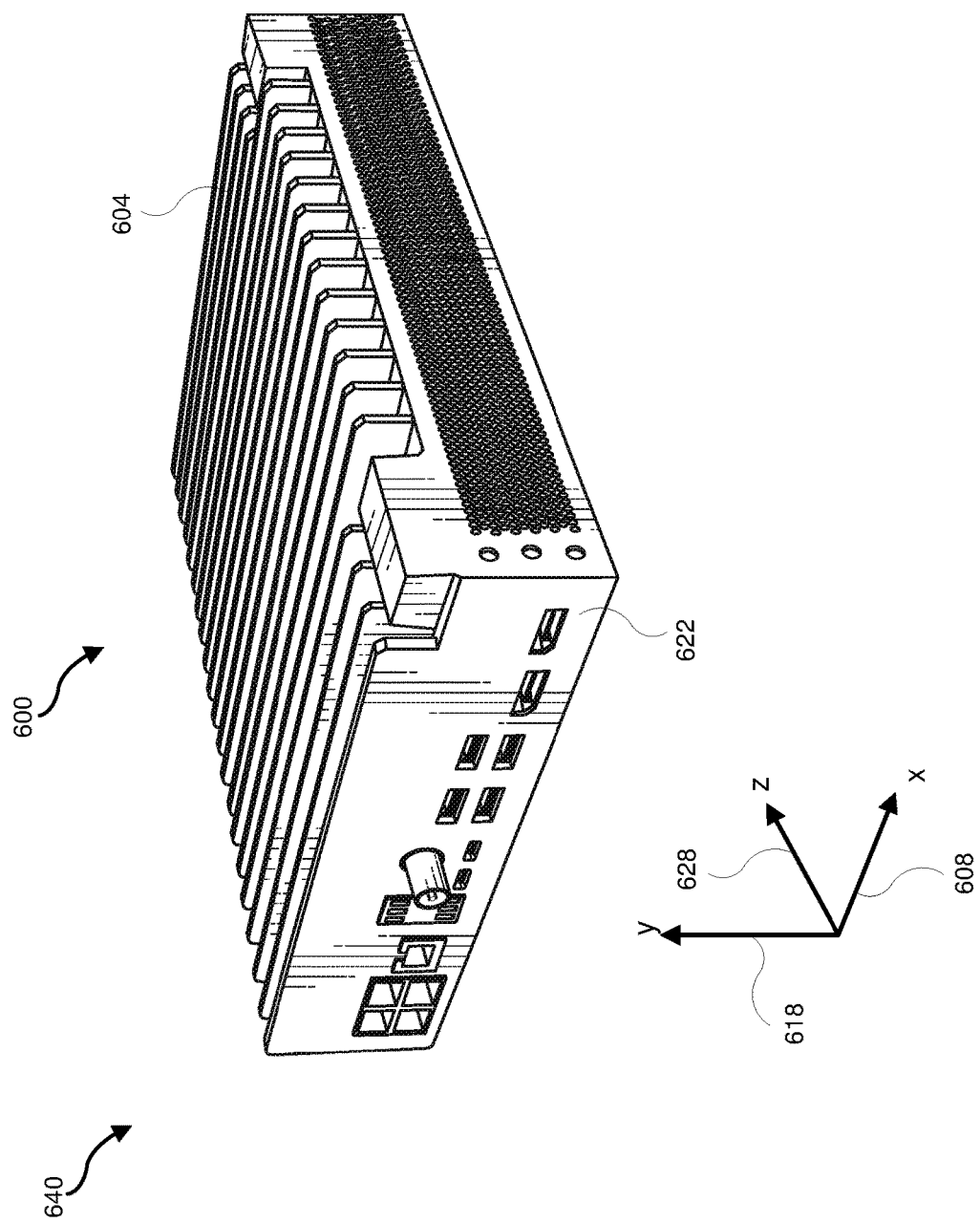
FIG. 6D shows a fourth view of the processing platform.

FIG. 6D shows a fourth view 640 of the processing platform 600. For example, the processing platform 600 may be placed in an orientation aligned with the "z" axis 628 (e.g., a "z" direction) such that a video connection side 622 is facing forward.

Figure 6E:
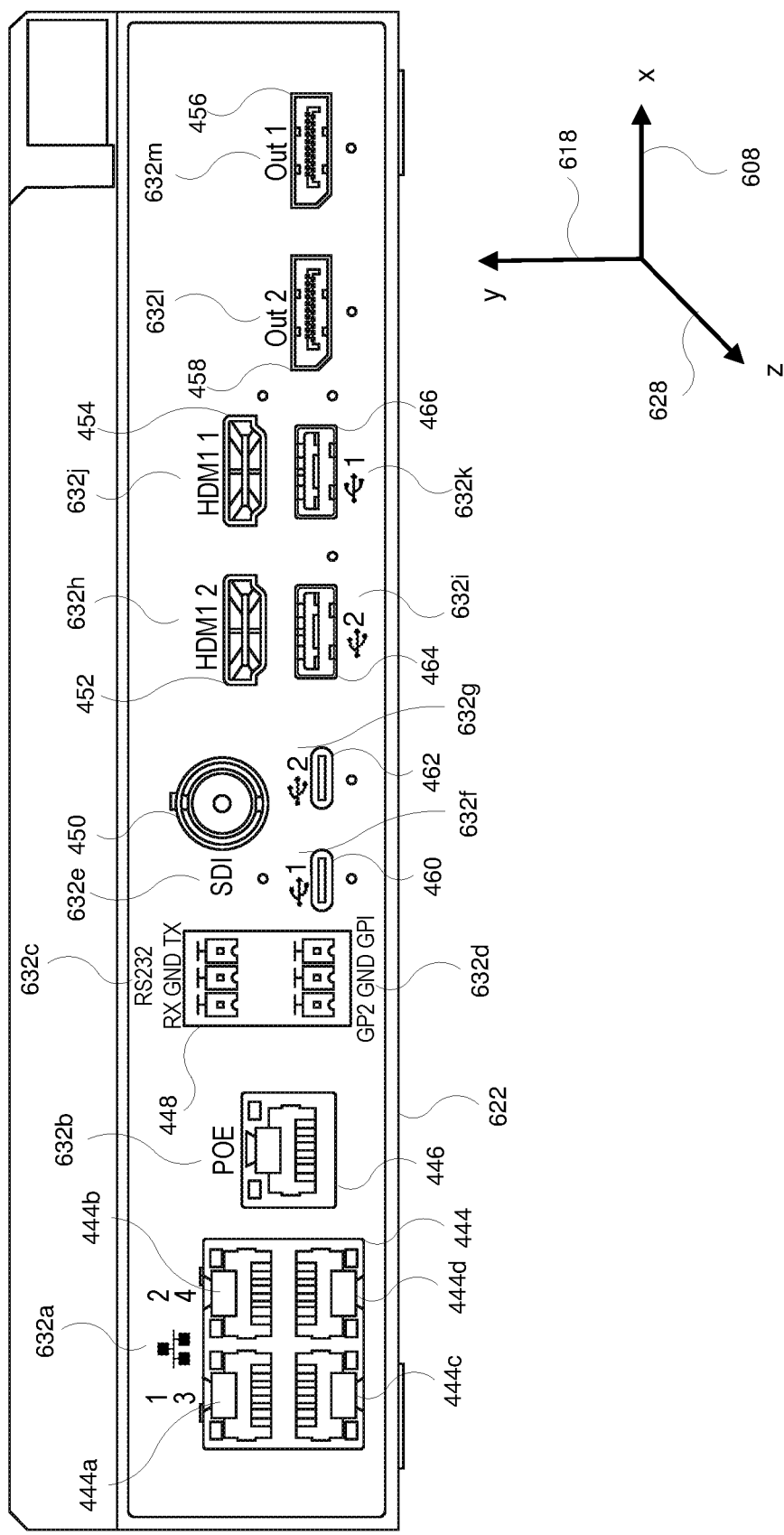
FIG. 6E shows connectors and labels associated with each connector included on a second side of the processing platform when the processing platform is orientated such that the second side is facing forward.

FIG. 6E shows connectors and labels 632*a-m* associated with each connector included on the video connection side 622 of the processing platform 600 when the processing platform 600 is orientated such that the video connection side 622 is facing forward (e.g., as shown in the fourth view 640 in FIG. 6D). As shown in FIG. 6E, the connectors are the connectors included in the system 300 as shown, for example, in FIGS. 3-5.

Figure 6F:
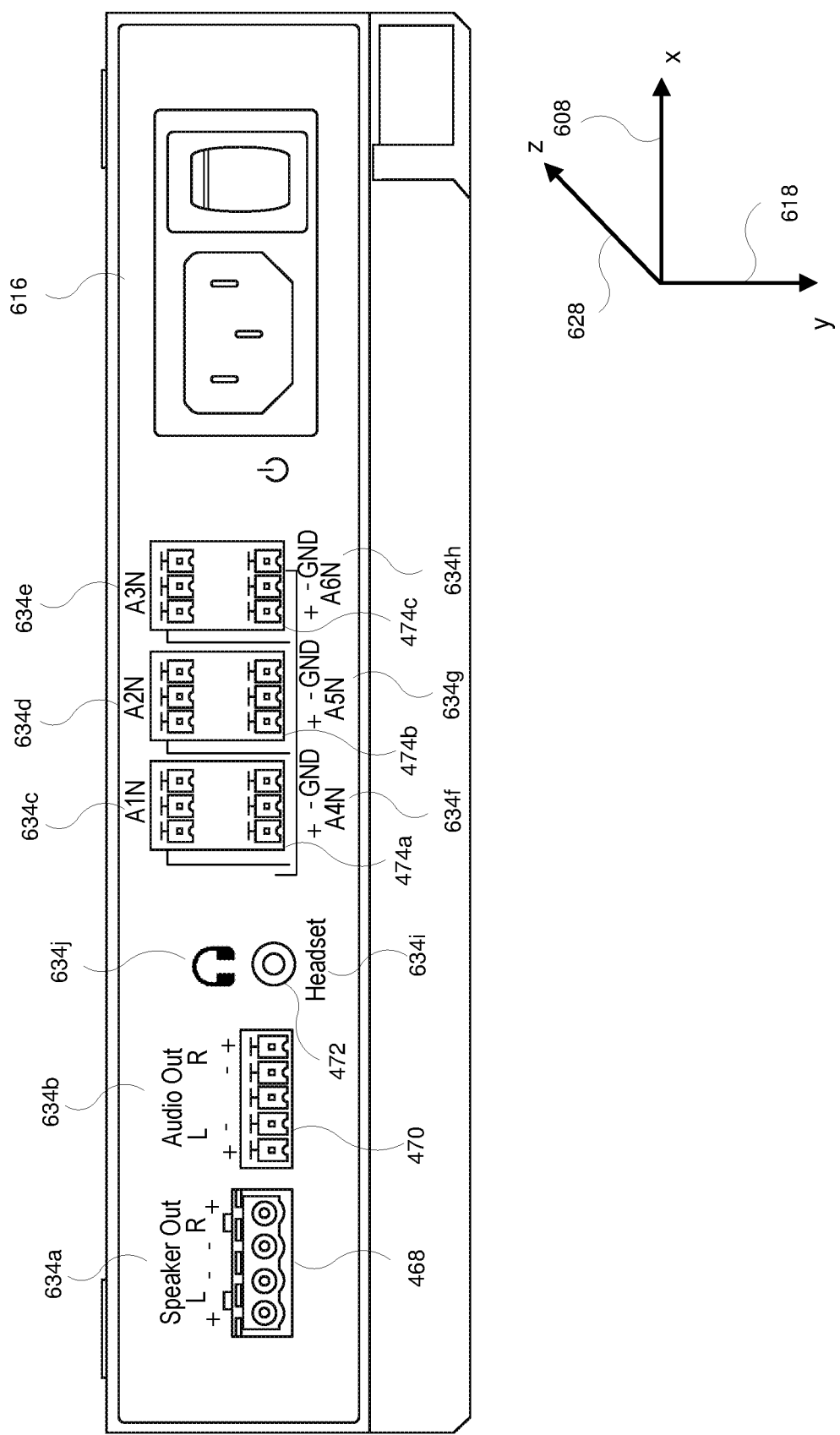
FIG. 6F shows connectors and labels associated with each connector included on a first side of the processing platform when the processing platform is orientated such that the first side is as shown in the third view.

FIG. 6F shows connectors and labels 634*a-j* associated with each connector included on the audio connection side 616 of the processing platform 600 when the processing platform 600 is orientated such that the audio connection side 616 is as shown in the third view 630 in FIG. 6C. In the third view 630, the processing platform 600 is orientated such that the audio connection side 616 is considered parallel with the "x" axis 608 (e.g., the "x" direction) and perpendicular to the "y" axis 618 (e.g., the "y" direction). As shown in FIG. 6F, the connectors are the connectors included in the system 300 as shown, for example, in FIGS. 3-5. FIG. 6F shows the labels 634*a-j* included on the audio connection side 616 so that they are not inverted (upside-down) and may be considered as right-side up and may be more easily read as compared to the directional orientation of the labels 636*a-j* as shown in FIG. 6C. The text included in the labels 634*a-j* may be right-side up relative to the "y" axis 618 (the "y" direction) improving the readability of the text.

Figure 6G:
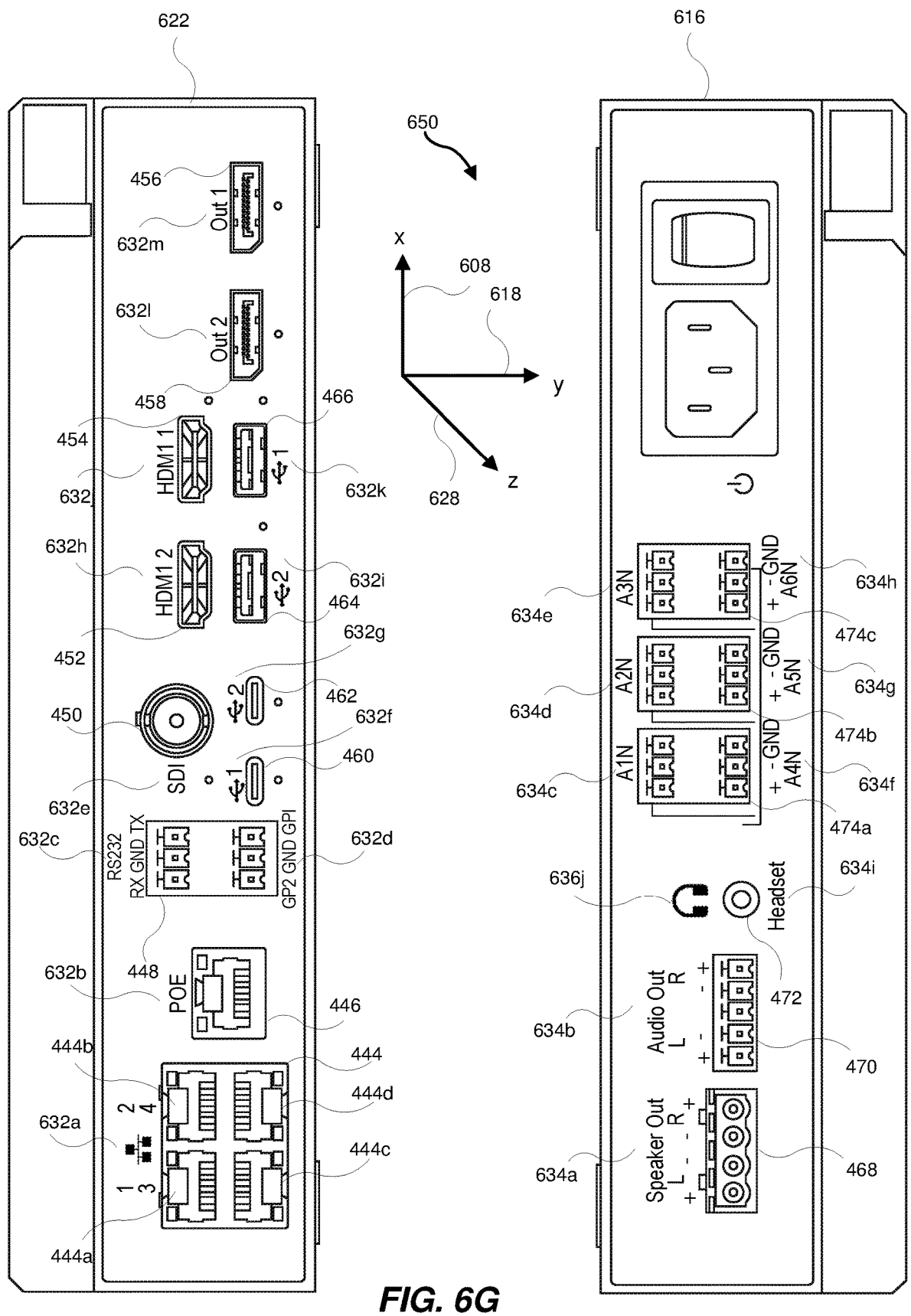
FIG. 6G shows a fifth view of the processing platform showing a first side and a second side as viewed by a user when the processing platform is orientated with the first side and the second side parallel to an "x" axis.

FIG. 6G shows a fifth view 650 of the processing platform 600 showing the audio connection side 616 and the video connection side 622 as viewed by a user when the processing platform 600 is orientated with the audio connection side 616 and the video connection side 622 parallel to the "x" axis 608 (e.g., the "x" direction). For example, the fifth view may be of the processing platform 600 when mounted to a wall and behind a monitor or HDTV. As shown in FIG. 6G, a user can easily read the labels 632*a-m* included on the video connection side 622 of the processing platform 600 and can easily read the labels 634*a-j* included on the audio connection side 616 of the processing platform 600 based on the orientation of the labels 634*a-j* and the labels 632*a-m*.

Figure 7:
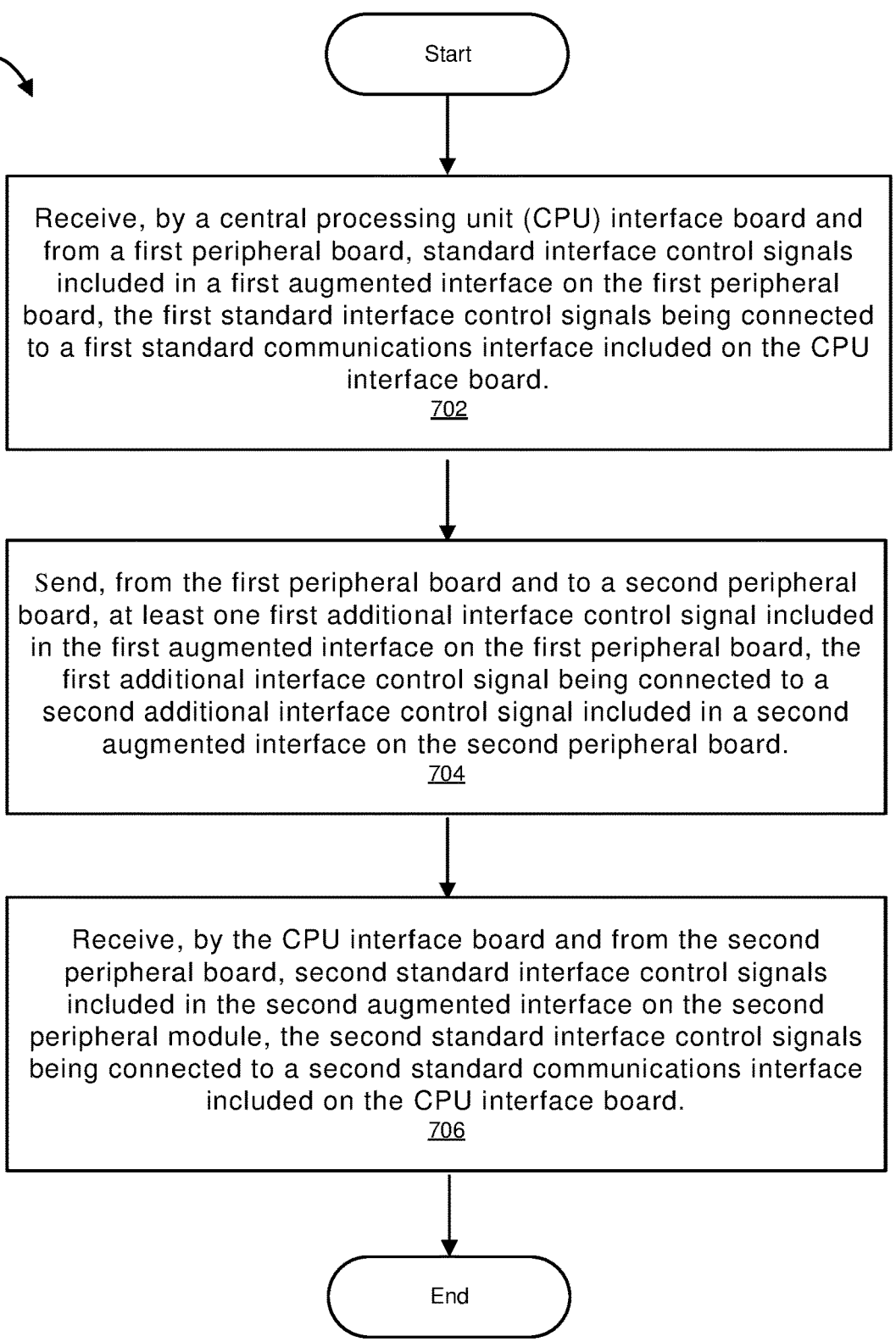
FIG. 7 is a flow diagram of an exemplary method for the use of augmented interfaces.

FIG. 7 is a flow diagram of an exemplary computer-implemented method 700 for the use of augmented interfaces. The steps shown in FIG. 7 may be performed by any suitable computer-executable code and/or computing system, including the system(s) illustrated in FIGS. 1-5. In one example, each of the steps shown in FIG. 7 may represent an algorithm whose structure includes and/or is represented by multiple sub-steps, examples of which will be provided in greater detail below.

As illustrated in FIG. 7, at step 702 one or more of the systems described herein may receive, by a central processing unit (CPU) interface board and from a first peripheral board, standard interface control signals included in a first augmented interface on the first peripheral board, the first standard interface control signals being connected to a first standard communications interface included on the CPU interface board.

The systems described herein may perform step 702 in a variety of ways. In one example, referring to FIGS. 2-3, the CPU interface board 218 may receive standard interface control signals from the PCIe interface 206 included in the augmented PCIe interface 202 on the video board 214 by way of the connection 220 to the PCIe port 226 included on the CPU interface board 218.

At step 704, one or more of the systems described herein may send, from the first peripheral board and to a second peripheral board, at least one first additional interface control signal included in the first augmented interface on the first peripheral board, the first additional interface control signal being connected to a second additional interface control signal included in a second augmented interface on the second peripheral board.

The systems described herein may perform step 704 in a variety of ways. In one example, referring to FIGS. 2-3, the video board 214 may send out-of-band additional interface signals 208 by way of the connection 224 to the out-of-band additional interface control signals 212 included on the audio board 216.

At step 706, one or more of the systems described herein may receive, by the CPU interface board and from the second peripheral board, second standard interface control signals included in the second augmented interface on the second peripheral module, the second standard interface control signals being connected to a second standard communications interface included on the CPU interface board.

The systems described herein may perform step 706 in a variety of ways. In one example, referring to FIGS. 2-3, the CPU interface board 218 may receive standard interface control signals from the USB interface 210 included in the augmented USB interface 204 on the audio board 216 by way of the connection 222 to the USB port 228 included on the CPU interface board 218.

The architecture for a mini-PC described herein provides a balance between a fully integrated custom PC board embedded system with video and audio capabilities fully integrated in the PC board (a lowest cost option) and a standard generic motherboard with plugin, add-in cards for each of the video and audio capabilities (the easiest way to build the system). The architecture for a mini-PC described herein provides the modularity (and build ease) of the add-in cards while providing the custom features of the custom PC board embedded system. For example, the add-in cards may include a standard connection in a non-standard form factor that includes additional out-of-band controls and connections in an augmented connection.

For example, as described herein referring to FIG. 3, a standard PCIe connection may be used to connect an Field Programmable Gate Array (FPGA) included on the video board 214 for video capture in the mini-PC. Additional out of (PCIe) band connections (e.g., additional interface signals 208) are available to augment the functionality of the video board 214. For example, the additional out-of-band connections may be used to directly connect to the audio board 216. The additional out of (PCIe) band connections, signals, and controls may be used to augment the video capture capability of the video board 214.

For example, as described herein referring to FIG. 3, a standard USB connection may be used to connect to an audio digital signal processing (DSP) device included on the audio board 216 for audio input and output in the mini-PC. Additional out of (USB) band connections (e.g., additional interface signals 212) are available to augment the functionality of the audio board 216. For example, the additional out-of-band connections may be used to directly connect to the video board 214. Such and interface and connections may not be possible using a standard compliant USB card as an add-in card in a mini-PC. The additional out of (USB) band connections, signals, and controls may be used to augment the functionality of the audio board 216 over what is possible using stand USB audio.

In another example, referring to FIG. 1, the out-of-band connections, signals, and controls may be used to reset and/or power cycle boards and modules outside of normal standard interface connections. For example, as described herein, the out-of-band additional interface control signal(s) 108 may be connected to an interface control port A 132 included in the CPU interface board 118. The CPU interface board 118 may include the circuitry and controls that provide the signals from the interface control port A 132 to the peripheral board 114 that may reset circuitry included on the peripheral board 114 and that may power cycle the peripheral board 114.

In another example, referring to FIG. 1, the out-of-band connections, signals, and controls may be used to disconnect interfaces and force hotplug events. For example, as described herein, the out-of-band additional interface control signal(s) 112 may be connected to an interface control port A 132 included in the CPU interface board 118. The CPU interface board 118 may include the circuitry and controls that provide the signals from the interface control port A 132 to the peripheral board 114 that may cause a disconnect of the interface between the standard interface control signal(s) 110 included on the peripheral board 116 and the standard port B 128 included on the CPU interface board 118 and force a hotplug event.

The architecture for a mini-PC described herein provides a balance between features, may use existing interconnection standards, provides a cost benefit over the use of a standard generic motherboard with standard add-in cards, leverages the use of standard operating system code support for interconnection standards while providing flexibility by using augmented interfaces.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive communication, video, and/or audio data to be transformed, transform the communication, video, and/or audio data, output a result of the transformation to enable communication between boards, and to provide input and/or output to a peripheral device, use the result of the transformation to control communications between boards and/or to control video and/or audio input and output to one or more peripheral devices, and store the result of the transformation to control the peripheral devices. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
    a central processing unit (CPU) interface board comprising:
        a first port of a first interface standard; and
        a second port of a second interface standard;
    a first peripheral board including a first augmented port comprising:
        a first set of connections of the first interface standard configured to connect to the first port; and
        a second set of connections that are out of band of the first interface standard; and
    a second peripheral board including a second augmented port comprising:
        a third set of connections of the second interface standard configured to connect to the second port; and
        a fourth set of connections that are out of band of the second interface standard and configured to connect to the second set of connections, wherein the first peripheral board interfaces with the CPU interface board and the second peripheral board using a communication protocol associated with the first interface standard when the first set of connections are connected to the first port and the second set of connections are connected to the fourth set of connections.

2. The system of claim 1, further including a first augmented interface module including a first interface control module and a first additional interface control module, the first interface control module configured to implement the communication protocol associated with the first interface standard for the first set of connections, and the first additional interface control module configured to implement the communication protocol associated with the first interface standard for the second set of connections.

3. The system of claim 2, further including a second augmented interface module including a second interface control module and a second additional interface control module, the second interface control module configured to implement a communication protocol associated with the second interface standard for the third set of connections, and the second additional interface control module configured to implement the communication protocol associated with the second interface standard for fourth set of connections.

4. The system of claim 3, wherein the first interface standard is a Peripheral Component Interconnect Express (PCIe) interface standard.

5. The system of claim 4, wherein the second interface standard is a Universal Serial Bus (USB) interface standard.

6. The system of claim 1, wherein the CPU interface board, the first peripheral board, and the second peripheral board are included in a processing platform.

7. The system of claim 6, wherein the processing platform includes a first plurality of connectors on an audio connection side and a second plurality of connectors on a video connection side, the first plurality of connectors and the second plurality of connectors for use in connecting the processing platform to one or more devices external to the processing platform.

8. The system of claim 7,
    wherein a first plurality of labels identify the first plurality of connectors;
    wherein a second plurality of labels identify the second plurality of connectors;
    wherein the first plurality of labels are oriented for readability right-side up along an "y" direction; and
    wherein the second plurality of labels are oriented for readability right-side up along the "y" direction.

9. The system of claim 1, wherein:
    the CPU interface board further includes an interface control port; and
    at least one connection included in the third set of connections is connected to at least one connection included in the interface control port.

10. An apparatus comprising:
    a central processing unit (CPU) board comprising:
        a first port of a first interface standard;
        a second port of a second interface standard; and
        a plurality of CPU external connectors;
    a video board comprising a video augmented interface comprising:
        a first set of connections of the first interface standard configured to connect to the first port;
        a second set of connections that are out of band of the first interface standard; and
        a plurality of video external connectors, the video board configured to plug into the CPU board by connecting the first set of connections to the first port; and
    an audio board comprising an audio augmented interface comprising:
        a third set of connections of the second interface standard configured to connect to the second port;
        a fourth set of connections that are out of band of the second interface standard and configured to connect to the second set of connections; and
        a plurality of audio external connectors, the audio board configured to:
            plug into the CPU board by connecting the fourth set of connections to the second port;
            interface with the video board when the fourth set of connections are connected to the second set of connections; and communicate with the CPU board and the video board using a protocol associated with the second interfaced standard.

11. The apparatus of claim 10, wherein:
the first interface standard is a Peripheral Component Interconnect Express (PCIe) interface standard; and
the second interface standard is a Universal Serial Bus (USB) interface standard.

12. The apparatus of claim 10, wherein the plurality of CPU external connectors, the plurality of video external connectors, and the plurality of audio external connectors connect the apparatus to one or more devices external to the apparatus.

13. The apparatus of claim 12, further including a mounting bracket coupled to a side of the apparatus.

14. The apparatus of claim 13,
wherein a plurality of video labels identify the plurality of video external connectors;
wherein a plurality of audio labels identify the plurality of audio external connectors;
wherein a plurality of CPU labels identify the plurality of CPU external connectors; and
wherein the plurality of video labels, the plurality of audio labels, and the plurality of CPU labels are oriented for readability right-side up along an "y" direction when the apparatus is mounted using the mounting bracket.

15. A computer-implemented method comprising:
connecting a first set of connections included in a first augmented port of a first peripheral board to a first port included in a central processing unit (CPU) interface board, the first port and the first set of connections being of a first interface standard;
connecting a second set of connections included in a second augmented port of a second peripheral board to a second port included in the CPU interface board, the second port and the second set of connections being of a second interface standard;
connecting a third set of connections included in the first augmented port of the first peripheral board to a fourth set of connections included in the second augmented port of the second peripheral board, the third set of connections being out of band of the first interface standard and the fourth set of connections being out of band of the second interface standard;
interfacing the CPU interface board with the first peripheral board using a communication protocol associated with the first interface standard; and
interfacing the CPU interface board with the second peripheral board using a communication protocol associated with the second interface standard.

16. The method of claim 15, wherein:
the first interface standard is a Peripheral Component Interconnect Express (PCIe) interface standard; and
the second interface standard is a Universal Serial Bus (USB) interface standard.

* * * * *